US012770854B2

(12) United States Patent
Bednar et al.

(10) Patent No.: US 12,770,854 B2
(45) Date of Patent: Oct. 20, 2026

(54) DIGITAL PANNING FOR RARE EARTH ELEMENTS

(71) Applicant: United States of America as Represented by The Secretary of The Army, Alexandria, VA (US)

(72) Inventors: Anthony Joseph Bednar, Vicksburg, MS (US); Elizabeth Jean Tomaszewski, Boulder, CO (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 4 days.

(21) Appl. No.: 18/660,077

(22) Filed: May 9, 2024

(65) Prior Publication Data

US 2025/0308876 A1 Oct. 2, 2025

Related U.S. Application Data

(60) Provisional application No. 63/465,365, filed on May 10, 2023.

(51) Int. Cl.
*H01J 49/10* (2006.01)
*H01J 49/00* (2006.01)

(52) U.S. Cl.
CPC ........ *H01J 49/105* (2013.01); *H01J 49/0036* (2013.01)

(58) Field of Classification Search
CPC .. H01J 49/0027; H01J 49/0036; H01J 49/105; H01J 49/0431; H01J 49/4215; G01N 23/222; G01N 33/2858; G01N 35/1009; G01N 35/00732
See application file for complete search history.

(56) References Cited

U.S. PATENT DOCUMENTS

| | | | | |
|---|---|---|---|---|
| 11,515,135 | B1 * | 11/2022 | Wiederin | G01N 35/1016 |
| 12,000,838 | B2 * | 6/2024 | Loboda | G01N 33/6848 |
| 12,601,697 | B2 * | 4/2026 | Fuka | G01N 23/222 |
| 2014/0121117 | A1 * | 5/2014 | Tanner | H01J 49/0418 506/4 |
| 2019/0214239 | A1 * | 7/2019 | Sugiyama | H01J 49/4215 |
| 2024/0096458 | A1 * | 3/2024 | Niazi | G01N 33/58 |
| 2024/0282565 | A1 * | 8/2024 | Zheng | G01N 33/24 |

* cited by examiner

*Primary Examiner* — Tung X Le
(74) *Attorney, Agent, or Firm* — Brian C. Jones; Lawrence A. Schemmel

(57) ABSTRACT

In one embodiment, a method of identifying at least one rare earth element (REE) in at least one sample comprises: analyzing the at least one sample by inductively coupled plasma mass spectrometry (ICP-MS), which comprises measuring, identifying, and recording an estimated concentration based on counts per second of a target analyte REE proxy indicating a presence or absence of the target analyte REE proxy in the at least one sample via ICP-MS; and identifying the target analyte REE proxy in the at least one sample at a counts per second (CPS) intensity measurement screening level of equal to or greater than a minimum intensity measurement threshold to verify the presence or absence of the target analyte REE proxy.

18 Claims, 27 Drawing Sheets

| USGS Sample Identification number QA/QC | Nd estimated for QA/QC samples (µg/L) | USGS Sample Identification Number | Nd estimated for original sample (µg/L) |
|---|---|---|---|
| 20211080134MDUP | 0.097 | | |
| 20211080134MSPK | 0.099 | | |
| 20211080134MSPKD | 0.097 | 20211080134 | 0.098 |
| 20211190083MDUP | 0.127 | | |
| 20211190083MSPK | 0.123 | | |
| 20211190083MSPKD | 0.128 | 20211190083 | 0.139 |
| 20211280055MDUP | 0.420 | | |
| 20211280055MSPK | 0.419 | | |
| 20211280055MSPKD | 0.425 | 20211280055 | 0.531 |
| 20211310109MDUP | 0.183 | | |
| 20211310109MSPK | 0.186 | | |
| 20211310109MSPKD | 0.183 | 20211310109 | 0.183 |
| 20211540116MDUP | 0.403 | | |
| 20211540116MSPK | 0.405 | | |
| 20211540116MSPKD | 0.398 | 20211540116 | 0.389 |
| 20211600201MDUP | 0.356 | | |
| 20211600201MSPK | 0.358 | | |
| 20211600201MSPKD | 0.352 | 20211600201 | 0.356 |
| 20211750086MDUP | 0.132 | | |
| 20211750086MSPK | 0.138 | | |
| 20211750086MSPKD | 0.135 | 20211750086 | 0.135 |
| 20211830084MDUP | 0.310 | | |
| 20211830084MSPK | 0.284 | | |
| 20211830084MSPKD | 0.288 | 20211830084 | 0.300 |
| 20212010131MDUP | 0.178 | | |
| 20212010131MSPK | 0.180 | | |
| 20212010131MSPKD | 0.177 | 20212010131 | 0.179 |
| 20212310009MDUP | 0.138 | | |
| 20212310009MSPK | 0.139 | | |
| 20212310009MSPKD | 0.138 | 20212310009 | 0.133 |
| 20212320245MDUP | 0.791 | | |
| 20212320245MSPK | 0.778 | | |
| 20212320245MSPKD | 0.814 | 20212320245 | 0.783 |
| 20212450129MDUP | 1.272 | | |
| 20212450129MSPK | 1.274 | | |
| 20212450129MSPKD | 1.231 | 20212450129 | 1.413 |
| 20212520420MDUP | 0.107 | | |
| 20212520420MSPK | 0.110 | | |
| 20212520420MSPKD | 0.108 | 20212520420 | 0.108 |
| 20212580084MDUP | 0.187 | | |
| 20212580084MSPK | 0.204 | | |
| 20212580084MSPKD | 0.204 | 20212580084 | 0.203 |
| 20212870084MDUP | 0.408 | | |
| 20212870084MSPK | 0.405 | | |
| 20212870084MSPKD | 0.423 | 20212870084 | 0.422 |
| 20212740320MDUP | 0.088 | | |
| 20212740320MSPK | 0.081 | | |
| 20212740320MSPKD | 0.088 | 20212740320 | 0.090 |
| 20213020010MDUP | 0.288 | | |
| 20213020010MSPK | 0.316 | | |
| 20213020010MSPKD | 0.316 | 20213020010 | 0.303 |
| 20213020139MDUP | 0.121 | | |
| 20213020139MSPK | 0.120 | | |
| 20213020139MSPKD | 0.119 | 20213020139 | 0.123 |
| 20220110075MDUP | 1.343 | | |
| 20220110075MSPK | 1.368 | | |
| 20220110075MSPKD | 1.354 | 20220110075 | 1.350 |
| 20220200080MDUP | 0.200 | | |
| 20220200080MSPK | 0.200 | | |
| 20220200080MSPKD | 0.201 | 20220200080 | 0.199 |
| 20220400021MDUP | 1.026 | | |
| 20220400021MSPK | 1.055 | | |
| 20220400021MSPKD | 1.049 | 20220400021 | 1.001 |
| 20220410109MDUP | 0.288 | | |
| 20220410109MSPK | 0.288 | | |
| 20220410109MSPKD | 0.291 | 20220410109 | 0.281 |
| 20220450004MDUP | 0.113 | | |
| 20220450004MSPK | 0.119 | | |
| 20220450004MSPKD | 0.118 | 20220450004 | 0.115 |

FIG. 3

| USGS Sample Identification number | Latitude | Longitude | Nd counts per second (CPS) | Predicted Nd (μg/L) | Measured Nd (μg/L) | Absolute Difference |
|---|---|---|---|---|---|---|
| 20212380293 | 42.6144781 | -83.02659329 | 131.86 | 0.009 | 0.009 | 0.000 |
| 20212530283 | 40.19340427 | -80.7342482 | 43.52 | 0.003 | 0.017 | 0.014 |
| 20213080242 | 46.34346299 | -120.186995 | 100.26 | 0.007 | 0.010 | 0.003 |
| 20212390108 | 38.95115948 | -90.3712256 | 196.36 | 0.013 | 0.054 | 0.040 |
| 20212600163 | 42.17833333 | -106.8758333 | 189.55 | 0.013 | 0.019 | 0.006 |
| 20213370105 | Non-environmental | Non-environmental | 8.88 | 0.001 | 0.000 | 0.000 |
| 20212930172 | 39.75527778 | -121.8805556 | 38.44 | 0.003 | 0.002 | 0.001 |
| 20212300252 | 41.25888889 | -95.92222222 | 66.66 | 0.005 | 0.008 | 0.003 |
| 20212880074 | Non-environmental | Non-environmental | -0.28 | 0.000 | 0.000 | 0.000 |
| 20212930104 | 39.19833333 | -96.30527778 | 90.75 | 0.006 | 0.009 | 0.003 |
| 20213000149 | 39.55916667 | -104.9994444 | 173.53 | 0.012 | 0.012 | 0.001 |
| 20212950025 | 43.65916667 | -111.905 | 354.12 | 0.024 | 0.025 | 0.001 |
| 20212290040 | 38.41416667 | -121.5213889 | 140.18 | 0.009 | 0.007 | 0.003 |
| 20212180076 | 38.64833333 | -104.6930556 | -2.31 | 0.000 | 0.001 | 0.001 |
| 20212320195 | 37.16583333 | -118.2813889 | 27.28 | 0.002 | 0.001 | 0.001 |
| 20212000027 | 38.47472222 | -107.2061111 | 139.07 | 0.009 | 0.008 | 0.001 |
| 20212290035 | 38.31027778 | -121.5983333 | 162.06 | 0.011 | 0.011 | 0.000 |
| 20212080052 | 47.96833333 | -102.2575 | 784.61 | 0.053 | 0.144 | 0.090 |
| 20212370160 | 38.66416667 | -108.0030556 | 67.60 | 0.005 | 0.031 | 0.026 |
| 20212870276 | 61.48444444 | -142.8863889 | 37.29 | 0.003 | 0.008 | 0.005 |
| 20212700003 | 40.99916667 | -73.98916667 | 209.00 | 0.014 | 0.020 | 0.006 |
| 20212910018 | 42.81527778 | -111.5066667 | 100.99 | 0.007 | 0.032 | 0.025 |
| 20212450162 | Non-environmental | Non-environmental | 62.80 | 0.004 | 0.013 | 0.009 |
| 20212030222 | 38.33888889 | -113.0283333 | 15.37 | 0.001 | 0.002 | 0.001 |
| 20212040126 | 37.68416667 | -109.6647222 | 12.67 | 0.001 | 0.002 | 0.001 |
| 20212950004 | 37.03777778 | -88.52944444 | 405.70 | 0.027 | 0.029 | 0.001 |
| 20213510069 | 34.33888889 | -117.2569444 | 96.74 | 0.007 | 0.032 | 0.026 |
| 20212450366 | 39.49916667 | -121.6052778 | 2.39 | 0.000 | 0.004 | 0.004 |
| 20212930145 | 42.81916667 | -76.13611111 | 59.49 | 0.004 | 0.007 | 0.003 |
| 20220410048 | 42.31527778 | -93.15194444 | 105.40 | 0.007 | 0.008 | 0.001 |
| 20220280011 | 38.33138889 | -107.7791667 | 124.53 | 0.008 | 0.006 | 0.003 |
| 20212030211 | 38.29361111 | -113.0180556 | 31.17 | 0.002 | 0.006 | 0.004 |
| 20212620216 | 40.42555556 | -105.2122222 | -2.48 | 0.000 | 0.001 | 0.001 |
| 20212030133 | 37.74166667 | -109.6888889 | 96.68 | 0.007 | 0.009 | 0.002 |
| 20220380039 | 41.25888889 | -95.92222222 | 81.79 | 0.006 | 0.005 | 0.000 |
| 20212230258 | 42.31527778 | -93.15194444 | 1.33 | 0.000 | 0.023 | 0.022 |
| 20211970191 | 42.81527778 | -111.5066667 | 379.66 | 0.026 | 0.018 | 0.008 |
| 20213010017 | 37.02805556 | -94.51361111 | 259.17 | 0.018 | 0.049 | 0.031 |
| 20212640152 | 48.40055556 | -115.3186111 | 70.77 | 0.005 | 0.013 | 0.008 |
| 20212310143 | 34.255 | -114.0088889 | 80.22 | 0.005 | 0.004 | 0.002 |
| Blank 1 | | | | | 0.001 | |
| Blank 2 | | | | | -0.001 | |
| Blank 3 | | | | | -0.001 | |

FIG. 6

| Element | Reported T-255 value (µg/L)* | ERDC-EL Measured Nd (µg/L) | ERDC-EL Q-STAR predicted Nd (µg/L) | ERDC-EL Q-STAR predicted Nd with Sm correction (µg/L) |
|---|---|---|---|---|
| Nd | 0.118 | 0.105 ± 0.002 | 0.099 ± 0.003 | 0.109 ± 0.003 |

*Value from U.S. Geological Survey Standard Reference Sample Project (U.S. Geological Survey, 2023).

FIG. 8

| | La | Ce | Pr | Nd | Sm | Gd | Y |
|---|---|---|---|---|---|---|---|
| Al | 0.71 | 0.73 | 0.71 | 0.71 | 0.72 | 0.64 | 0.66 |
| As | 0.09 | 0.07 | 0.06 | 0.05 | 0.03 | -0.02 | 0.00 |
| B | 0.01 | 0.08 | -0.01 | -0.02 | -0.02 | 0.05 | -0.05 |
| Ba | 0.12 | 0.21 | 0.10 | 0.09 | 0.08 | 0.07 | -0.08 |
| Be | 0.66 | 0.66 | 0.65 | 0.65 | 0.64 | 0.60 | 0.70 |
| Ca | -0.11 | -0.06 | -0.11 | -0.12 | -0.13 | -0.12 | -0.21 |
| Cd | 0.14 | 0.13 | 0.13 | 0.11 | 0.10 | 0.11 | 0.08 |
| Ce | 0.95 | 1.00 | 0.95 | 0.95 | 0.95 | 0.91 | 0.83 |
| Co | 0.41 | 0.45 | 0.40 | 0.40 | 0.40 | 0.42 | 0.40 |
| Cr | 0.55 | 0.50 | 0.57 | 0.58 | 0.58 | 0.52 | 0.55 |
| Cu | 0.18 | 0.14 | 0.18 | 0.17 | 0.16 | 0.18 | 0.15 |
| Fe | 0.44 | 0.48 | 0.43 | 0.44 | 0.44 | 0.42 | 0.51 |
| Ga | 0.64 | 0.70 | 0.64 | 0.64 | 0.65 | 0.58 | 0.55 |
| Gd | 0.93 | 0.91 | 0.94 | 0.94 | 0.94 | 1.00 | 0.86 |
| K | 0.07 | 0.17 | 0.05 | 0.04 | 0.04 | 0.10 | -0.01 |
| La | 1.00 | 0.95 | 0.99 | 0.98 | 0.97 | 0.93 | 0.87 |
| Li | 0.05 | 0.12 | 0.05 | 0.03 | 0.01 | 0.02 | -0.12 |
| Mg | -0.07 | -0.04 | -0.08 | -0.09 | -0.10 | -0.07 | -0.15 |
| Mn | 0.09 | 0.11 | 0.08 | 0.08 | 0.08 | 0.11 | 0.15 |
| Mo | 0.08 | 0.09 | 0.08 | 0.07 | 0.06 | 0.07 | -0.03 |
| Na | -0.01 | -0.04 | -0.04 | -0.06 | -0.10 | -0.01 | -0.13 |
| Nd | 0.98 | 0.95 | 1.00 | 1.00 | 0.99 | 0.94 | 0.88 |
| Ni | 0.15 | 0.19 | 0.14 | 0.13 | 0.14 | 0.18 | 0.15 |
| P | 0.04 | 0.13 | 0.02 | 0.02 | 0.02 | 0.08 | -0.05 |
| Pb | 0.51 | 0.48 | 0.50 | 0.50 | 0.49 | 0.49 | 0.50 |
| Pr | 0.99 | 0.95 | 1.00 | 1.00 | 0.99 | 0.94 | 0.87 |
| Rb | 0.14 | 0.24 | 0.12 | 0.10 | 0.10 | 0.21 | 0.12 |
| Sb | 0.19 | 0.19 | 0.18 | 0.17 | 0.15 | 0.17 | 0.11 |
| SiO2 | 0.11 | 0.17 | 0.12 | 0.11 | 0.12 | 0.15 | 0.14 |
| Sm | 0.97 | 0.95 | 0.99 | 0.99 | 1.00 | 0.94 | 0.90 |
| Sr | -0.10 | -0.04 | -0.11 | -0.13 | -0.15 | -0.13 | -0.30 |
| Ti | 0.65 | 0.67 | 0.65 | 0.65 | 0.67 | 0.56 | 0.60 |
| U | 0.17 | 0.16 | 0.18 | 0.16 | 0.14 | 0.13 | -0.03 |
| V | 0.22 | 0.29 | 0.20 | 0.19 | 0.19 | 0.13 | 0.09 |
| W | -0.17 | -0.16 | -0.17 | -0.18 | -0.19 | -0.20 | -0.28 |
| Y | 0.87 | 0.83 | 0.87 | 0.88 | 0.90 | 0.86 | 1.00 |
| Zn | 0.23 | 0.23 | 0.20 | 0.20 | 0.18 | 0.24 | 0.15 |

FIG. 24

DIGITAL PANNING FOR RARE EARTH ELEMENTS

CROSS-REFERENCE TO RELATED APPLICATIONS

This is a nonprovisional application that claims the benefit of priority from U.S. Provisional Application No. 63/465,365 entitled "Method of Digital Panning for Rare Earth Elements," filed May 10, 2023, the disclosure of which is incorporated herein by reference in its entirety.

STATEMENT OF GOVERNMENT INTEREST

Under paragraph 1(a) of Executive Order 10096, the conditions under which this invention was made entitle the Government of the United States, as represented by the Secretary of the Army and the Secretary of the Interior, to an undivided interest therein on any patent granted thereon by the United States. This and related patents are available for licensing to qualified licensees.

BACKGROUND

Field of the Invention

The present invention relates to systems and methods of identifying rare earth elements (REEs) in samples.

Description of the Related Art

This section introduces aspects that may help facilitate a better understanding of the invention. Accordingly, the statements of this section are to be read in this light and are not to be understood as admissions about what is prior art or what is not prior art.

REEs are a critical resource in modern advanced electronics and other technologies and are a finite resource. Identification and discovery of new sources of REEs will drive competition and reduce reliance on sources from a single primary producer. The methods of the invention could rapidly and accurately identify new sources of REEs for those individuals, businesses, and countries reliant upon stable and available REE resources.

Rare earth elements (REEs) are not generally found in concentrated deposits. REEs are present in samples with very low background levels, such as most environmental water and solid matrices. Therefore, detection of potentially economically recoverable deposits of REEs is challenging, often requiring intensive geologic or geochemical exploration specifically targeting areas for REEs.

LREEs (Light REEs) include lanthanum (La), cerium (Ce), praseodymium (Pr), neodymium (Nd) and samarium (Sm) and are typically found in higher amounts and are more soluble, with the exception of Pm which is extremely rare because all isotopes of Pm are radioactive with short half-lives. Typical LREEs sources are carbonates and phosphates such as monazite. In some literature sources, europium (Eu) and gadolinium (Gd) have their own classification as middle REEs (or MREEs), while others classify them as HREEs. HREEs typically include terbium (Tb), dysprosium (Dy), holmium (Ho), erbium (Er), thulium (Tm), ytterbium (Yb), and lutetium (Lu) and these elements are less common than LREEs. HREEs (Heavy REEs) are found in oxides and phosphates such as xenotime however, the most common form of extraction is ion-adsorption processes with clays. Both LREEs and HREEs are typically found in the particularly stable +3 oxidation state, though Ce and Eu can be found in the +4 and +2 oxidation states, respectively. REEs also have similar ionic radii across the periodic table.

SUMMARY

Like many trivalent cations, REEs are sensitive to a suite of geochemical conditions (i.e., pH, redox, salinity etc.), can be complexed with inorganic (e.g., carbonate ($CO_3^{2-}$)) and organic (dissolved organic carbon) ligands, and can be adsorbed to colloidal and mineral phases. Using a proxy to identify REEs in water samples, as well as in digestates of soil, sediment, and biota samples, for example, and subsequently identifying potential surrounding sources of REEs, is therefore not something that has been attempted previously but is a feasible and potentially cost-effective method.

REEs are typically measured by Inductively Coupled Plasma Mass Spectrometry (ICP-MS) from a variety of matrices including water samples, acid mine drainage samples, and even from soil extractions. ICP-MS generally only monitors, and is calibrated for, specific target elements of interest. Measuring REEs quantitatively can be a costly and time-consuming task due to common interferences such as the isobaric interference of Ba on La and Ce and LREE oxide formation, as well as the relatively low detection limits needed, especially for HREEs. Analysis of water samples can be time consuming as a result of these instrumental interferences and low concentrations of REEs in surface waters. These difficulties have led to a lack of widespread investigation of REEs in water bodies when pursuing potential REE sources. Therefore, to allow for investigation of a large number of water samples and to optimize the amount of time used for focused quantification studies, the novel use of a proxy approach to screen samples for the presence or absence of REEs has been developed.

Addition of other target analyte masses to an ICP-MS method adds only milliseconds of time to the time needed to complete ICP-MS analysis. The resultant data is stored with the original target analyte data seamlessly, resulting in no negative impact to the ongoing chemical analyses or existing projects. The additional new target masses, such as m/z 144 [Nd and Sm] (or others, such as 154 [Sm and Gd], 164 [Dy and Er] or 176 [Yb, Lu, and Hf], among others), allows subsequent review and identification of samples that contain new target elements, and other potentially associated elements. REEs are often found together, so detection of Nd and/or Sm may be a surrogate for all other REEs. This proxy approach provides the ability to analyze and screen a very large number of samples efficiently and effectively, and at a very low cost, for REEs prior to the cost-intensive and labor-intensive quantitative analyses done once REE deposits/samples are known and investigated. Once a sample is identified as having REEs, investigators can collect more water, soil, or rock samples for further quantitative measurements to determine exact REE concentrations in an area. Geologic maps can also be referenced in the location and studies into potential deposits can be better informed.

Embodiments of the invention are directed to a low cost, efficient, and effective way to detect potential REE sources using a surrogate such as Nd. The method to identify and locate rare earth elements (REEs) provides methods to digitally pan for REEs utilizing a proxy approach to identify and locate potential resources. The novel method provides a proxy to identify REE hotspots through analysis of surface water and groundwater samples, as well as other samples such as digestates of soil, sediment, and biota samples. The method of the invention involves novel methods to identify and/or locate, i.e., digitally pan for, stable lanthanides (REEs) and other elements, and their locations, which are critical in certain industries and possibly to national security.

To accomplish this, the method uses a cost-effective analyte proxy to identify REEs in water and other possible types of samples and potential REE sources. The method comprises digital analyses and examination of potentially an unlimited number of water or other types of samples to identify, locate, and quantify REEs. The methods further provide a novel system for efficiently helping to identify REE reserves.

The end result of this robust control system is the ability to efficient process water sample data of large orders of magnitude to semi-quantitively and qualitatively analyze such data to identify REEs. The method of digitally panning for REEs and locating REE resources described provides an easily deployable and highly effective process to identify REEs and other elements.

According to an aspect the present invention, a method of identifying at least one rare earth element (REE) in at least one sample comprises: analyzing the at least one sample by inductively coupled plasma mass spectrometry (ICP-MS), which comprises measuring, identifying, and recording an estimated concentration based on counts per second of a target analyte REE proxy indicating a presence or absence of the target analyte REE proxy in the at least one sample via ICP-MS; and identifying the target analyte REE proxy in the at least one sample at a counts per second (CPS) intensity measurement screening level of equal to or greater than a minimum intensity measurement threshold to verify the presence or absence of the target analyte REE proxy.

In some embodiments, determining the minimum intensity measurement threshold based on a preset concentration of at least one REE having an isotope mass to charge ratio (m/z). The preset concentration may be about 0.1 μg/L concentration.

In specific embodiments, the method further comprises establishing the minimum intensity measurement threshold by quantitatively measuring a net intensity in counts per second (CPS) of an REE standard of at least one REE prepared from a certified standard solution, using ICP-MS, based on a preset concentration of the at least one REE having an isotope mass to charge ratio (m/z). The minimum intensity measurement threshold is established by analyzing a calibration curve measured with a certified ICP-MS standard on an ICP-MS instrument. The method may further comprise adjusting the minimum intensity measurement threshold, higher to narrow or lower to broaden a scope of identifying the target analyte REE.

In some embodiments, the method further comprises obtaining information on a physical location from which the sample was mined; and quantifying a concentration of at least one REE at the physical location. After identifying the target analyte REE proxy in the sample, the method further comprises collecting additional samples from the physical location to further delineate and quantify potential REE sources.

In specific embodiments, the method further comprises analyzing at least one second sample from a different location than the at least one sample by inductively coupled plasma mass spectrometry (ICP-MS), which comprises measuring, identifying, and recording an estimated concentration based on counts per second of a target analyte REE proxy indicating presence or absence of the target analyte REE proxy in the at least one second sample via ICP-MS; and identifying the target analyte REE proxy in the at least one second sample at a counts per second (CPS) intensity measurement screening level of equal to or greater than a minimum intensity measurement threshold to verify the presence or absence of the target analyte REE proxy. The method may further comprise quantifying a concentration of at least one REE in a region between the location of the at least the one sample and the location of the at least one second sample that had a verified presence of the target analyte REE proxy.

In some embodiments, the method further comprises cleaning and aggregating ICP-MS data obtained from performing ICP-MS on a plurality of samples; analyzing the plurality of samples which comprises measuring, identifying, and recording an estimated concentration based on counts per second of the target analyte REE proxy indicating presence or absence of the target analyte REE proxy in the plurality of samples via ICP-MS; and identifying the target analyte REE proxy in the plurality of samples at a counts per second (CPS) intensity measurement screening level of equal to or greater than the minimum intensity measurement threshold to verify the presence or absence of the target analyte REE proxy.

In accordance with another aspect of the invention, a non-transitory computer-readable recording medium storing a program including instructions that cause a processor to execute an operation to identify at least one rare earth element (REE) in at least one sample, comprising: analyzing the sample by inductively coupled plasma mass spectrometry (ICP-MS), which comprises measuring, identifying, and recording an estimated concentration based on counts per second of a target analyte REE proxy indicating presence or absence of the target analyte REE proxy in the at least one sample via ICP-MS; and identifying the target analyte REE proxy in the at least one sample at a counts per second (CPS) intensity measurement screening level of equal to or greater than a minimum intensity measurement threshold to verify the presence or absence of the target analyte REE proxy.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 3 shows a table of quality assurance/quality control (QA/QC) values from digitally panned dataset for samples having Nd detects and comparison to original sample.

FIG. 6 shows a table of REE values for a subset of samples used for negative controls.

FIG. 8 shows a Table of Nd results of USGS Standard Reference Sample T-255 analysis both quantitatively and using Q-STAR™.

FIG. 24 shows a table of Spearman rank correlation matrix results from archived subset of samples quantitatively analyzed for REEs and other elements at BCSL via both ICP-MS and ICP-OES.

DETAILED DESCRIPTION

Figure 1:
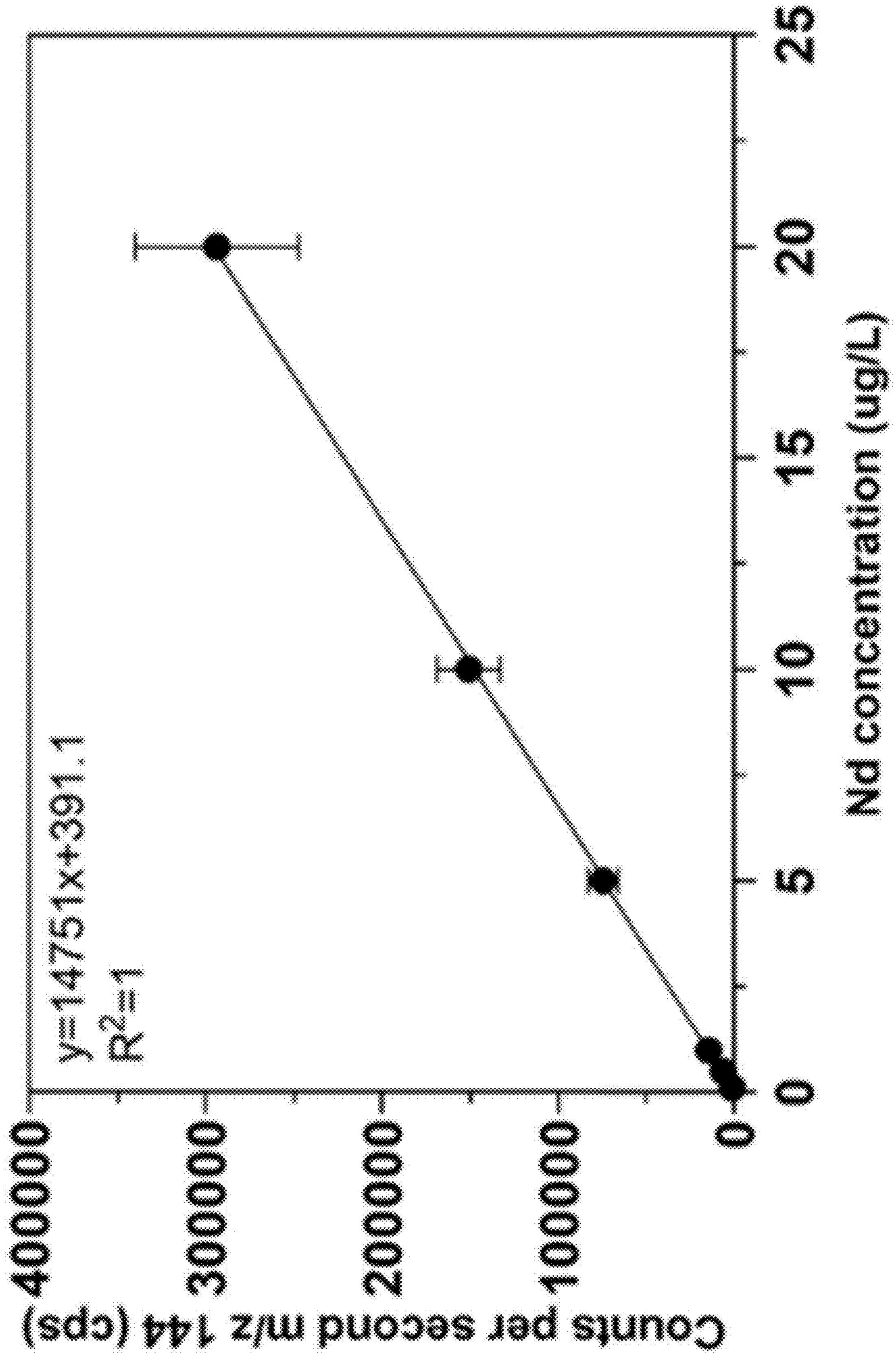
FIG. 1 shows a graphical plot of a measured Nd calibration curve.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

1. Introduction

Rare earth elements (REEs) are a class of critical minerals, all of which can have supply chain vulnerability that impacts economic security. These elements are widely measured in environmental matrices via inductively coupled plasma mass spectrometry (ICP-MS); however, successful quantification can require time consuming, sample specific optimization. While a sample-by-sample approach is appropriate for targeted quantification studies, this approach is not suitable for exploration efforts where rapidly screening thousands of samples for the presence of REEs is desired. A Quick Screening Tool for Approximating REEs (Q-STAR™) is used to detect REEs in surface water and groundwater matrices, collected as part of existing environmental studies.

To more rapidly identify sites that may contain REEs, the methods disclosed have been developed to rapidly, efficiently, and effectively screen thousands or even an unlimited number of samples that are already being collected for other chemical analyses, specifically metals, by Inductively Coupled Plasma Mass Spectrometry (ICP-MS). In one specific version or embodiment of the invention, the mass to charge ratio (m/z) 144 is included in the ICP-MS target list such that all samples analyzed will have counts per second (CPS) intensity measurements recorded for this mass. Neodymium (Nd) and Samarium (Sm) are two REEs that have natural occurring isotopes at mass 144, and therefore will result in a positive detection for that sample. The data are reviewed using computer scripts to sort through all sample results and identify the samples with CPS intensity measurements above a desired threshold. This threshold can be determined by analysis of a Nd and/or Sm standard at any predetermined concentration of interest. According to different embodiments, other target isotopes can be included as needed to expand the list of potential screening targets. Once the samples above the threshold are identified, subsequent ground truth or validated samples can be collected to confirm the REE detections and quantify the REE concentrations, or additional samples can be collected in the geographical area to further delineate and quantify potential REE sources.

The addition of a target m/z of 144 for example, using ICP-MS, as a representative of all REEs but specifically Nd and Sm, allows selective detection of REEs in any sample analyzed. Applying the method of the invention to the vast number of samples that are already collected across the country (or globally) for other purposes allows for leveraging of an enormous and expensive sample collection effort to create a geographically, geochemically, and geologically-broad REE detection and identification scheme. Subsequent electronic datasets are then sorted by computer scripts that extract the REE detections of interest above a predetermined threshold for additional review and investigation. Utilizing a specific mass to charge ratio with the ICP-MS process, followed by data mining for threshold "detections" of the target analyte, provides for rapid, efficient, and effective screening for the target REEs, in effect digital panning for REEs.

Embodiments of the invention allow for screening of large numbers of geologically, geochemically, and geographically distinct samples for REEs—an analogous process to physically panning for gold—in a semi-automated "digital panning" technique. The screening and detection process uses ICP-MS to identify samples that contain REEs. Subsequent automated computer scripts sort the data so that samples are marked for physical location identification based on the project that collected the specific samples. Various matrices can be screened, identified, and intensively sampled, characterized, and quantified for potential development of REE sources.

Rare earth elements (REEs) are classified as critical minerals, or mineral materials essential to the economic and national security of the United States as well as global economic security and that have a supply chain vulnerable to disruption. Therefore, it is crucial that potential REE resources are identified in a cost-effective and efficient way to meet national and global demands. Embodiments of the invention uses a proxy approach to identify potential REE hotspots via the analysis of samples such as both surface water and groundwater. The method disclosed involves using ICP-MS to screen for REEs, as a way to identify sources of REEs for potential investigation and recovery.

In specific embodiments, the proxy method utilizes one target analyte REE proxy Nd which has an isotope at mass 144. The ICP-MS instrument can be set to the specific mass to charge ratio (m/z) of 144 which is equivalent to this isotope (i.e., mass to charge ratio (m/z) of 144) for metals analyses.

The results showed that 18% of 6,626 samples demonstrated the presence of REEs above a reference threshold of 1,200 counts per second Using this digitally panned or screened dataset, estimated dissolved REE concentrations were mapped across the United States in relation to ecoregions and underlying geology. To validate Q-STAR™, REEs were measured in a USGS standard reference sample, a subset of 88 archived filtered water samples and in fresh filtered surface water samples.

The targeted analyses demonstrated strong linear relationship between Q-STAR™ predicted and measured values in all archived samples for Nd ($R^2$=0.94), and light REEs (LREEs) such as lanthanum (La) ($R^2$=0.93), praseodymium (Pr) ($R^2$=0.94), and samarium (Sm) ($R^2$=0.94). Using Q-STAR™ screen values, nine field sites were identified and surface water samples recollected to confirm the continued presence of Nd and LREEs. Q-STAR™ is a novel approach to explore an unlimited number of water samples for the presence of REEs prior to time intensive and costly quantitative analyses and to generate large REE datasets for further investigation. Because the method is qualitative and only measures one element, Nd, a quantitative analysis may be used after a sample of interest has been identified to quantify all desired REEs as well as measure an exact concentration of Nd.

Embodiments of the invention provide for a method that includes initially obtaining a sample for analysis. The method identifies at least one target analyte REE proxy and at least one REE in the sample utilizing a computer or microprocessor-based device. The method further includes analyzing the sample by measuring, identifying, and recording the estimated concentration based on counts per second (presence or absence) of the at least one target analyte REE proxy in the sample via ICP-MS.

The digital panning methodology of the invention identifies the at least one target analyte REE proxy in the sample at a counts per second (CPS) intensity measurement level of equal to or greater than an optimal or predetermined intensity measurement threshold in order to identify the presence or the absence of the at least one target analyte REE proxy and the at least one REE in the sample. The intensity measurement threshold level is adjustable in order to narrow or to broaden the scope of identifying and/or detecting REEs and is instrument specific to the ICP-MS used.

Further, embodiments of the invention may be directed to a non-transitory computer-readable recording medium that is encoded with instructions and/or storing a program that causes a computer or microprocessor-based device or one or more data processors to execute an operation of identifying a target analyte proxy in a sample, analyzing sample data for the presence or absence of the target analyte, analyzing sample data for the presence or absence of at least one REE, and extracting REE detections of interest above a predetermined counts per second (CPS) intensity measurement threshold.

To ground truth or validate digital panning efforts, REEs were measured in a subset of 88 archived samples and collected fresh environmental samples for trace metal/REE analysis at nine identified sites from two states, Colorado and Mississippi. The targeted quantitative analyses confirmed the presence of REEs in all samples of the measured archived subset and demonstrated relatively strong linear agreement between predicted and measured values for Nd ($R^2$=0.94) and light REEs (LREEs) such as samarium (Sm) ($R^2$=0.94), lanthanum (La) ($R^2$=0.93), and praseodymium (Pr) ($R^2$=0.94), as well as heavy REEs (HREEs) such as Gd ($R^2$=0.92), Terbium (Tb) ($R^2$=0.93), Holmium (Ho) ($R^2$=0.88), and Erbium (Er) ($R^2$=0.88). The linear relationship between predicted and measured values for Nd is not as robust in freshly collected environmental samples ($R^2$=0.67), but nevertheless illustrates that the Nd proxy is a distinct presence/absence indicator.

Further analysis highlighted elemental relationships such as that between Nd and aluminum (Al) ($\rho$=0.64-0.71), beryllium (Be) ($\rho$=0.67-0.72), and lead (Pb) ($\rho$=0.51-0.62). These results illustrate that using m/z=144 as a proxy provides a reasonable and distinct indication of REEs and that clear elemental relationships exist between REEs and other metals. The results provide preliminary areas for further REE reconnaissance.

Rare Earth Elements (REEs) consist of the 14 naturally occurring lanthanides in order of increasing atomic number: Lanthanum (La), Cerium (Ce), Praseodymium (Pr), Neodymium (Nd), Samarium (Sm), Europium (Eu), Gadolinium (Gd), Terbium (Tb), Dysprosium (Dy), Holmium (Ho), Erbium (Er), Thulium (Tm), Ytterbium (Yb) and Lutetium (Lu) as well as Scandium (Sc) and Yttrium (Y). Contrary to the moniker, these elements are not necessarily rare in the Earth's crust. For example, Ce is the 25$^{th}$ most abundant element in the Earth's crust and Lu and Tm are more abundant than elements such as cadmium and selenium. The most abundant REEs in the Earth's crust are Ce, Nd and La and total REEs can reach concentrations up to the sum of 817 mg/kg total REEs in acidic soils. Conversely, concentrations in natural waters have typically been measured on the ng/L or μg/L scale. While natural waters are therefore not an economically viable source of REEs, detection of aqueous REEs can be used as an inexpensive and rapid screening tool which can direct users towards potential geologic sources or other untapped sources such as waste as a resource.

The prevalence of these elements in a variety of industries and products including permanent magnets in electric cars, generators in wind turbines, the glass industries, pigments in ceramics, fertilizers, batteries, phones, computers, appliances, and medicine, makes them essential to global economic stability, and therefore a part of the U.S. Geological Survey (USGS) 2022 critical minerals list. Developing new methods to search for REEs, especially in matrices that are often overlooked such as filtered surface water and groundwater samples, herein referred to as dissolved waters, is an important step in fortifying the supply chain. The screening method developed here is not intended to replace traditional quantitative analysis but rather serve as an efficient, cost-effective preliminary test. While dissolved water concentrations are at the ng/L or μg/L scale, industrial use could contribute to increasing concentrations in water, allowing for screening methods to provide a positive presence indicator prior to quantification. Additionally, investigation of previously untapped or unknown geogenic sources could lead to potential REE recovery and these sources could be more quickly identified via screening. For example, the authors previously identified elevated concentrations of REEs in groundwater through anomalous detections of arsenic (As) by inductively coupled plasma mass spectrometry (ICP-MS), due to the double-charged interferences of Nd, Sm, and Eu on m/z=75. These anomalous As detections coincided with dramatically elevated recoveries (e.g., 1000%) of the Y and other REEs, which are internal standards commonly used in ICP-MS. The Y internal standard 'anomaly' is only observable in field samples with highly elevated REE concentrations; therefore, Q-STAR™ (measurement of m/z 144) was developed to specifically target REEs directly as a more sensitive detection scheme. Screening thousands of water samples for REEs prior to measuring hundreds via traditional targeted analysis allows for a broader swath of locations to be identified for subsequent investigations into potential resources, environmental health effects and hazards.

A screening approach that approximates rather than directly quantifies REEs is favored because quantification may require instrument parameter optimization on a sample-by-sample basis, which is not feasible when analyzing thousands of samples. Spectral interference challenges when quantifying REEs via ICP-MS include the formation of polyatomic species such as barium (Ba) oxides $^{130}Ba^{16}O^+$ for $^{146}Nd$ and $^{137}Ba^{16}O^+$ for $^{153}Eu$, hydrides and oxyhydrides $^{138}Ba^1H^+$ for $^{139}La$ and $^{136}Ba^{16}O^1H^+$ for $^{153}Eu$, and other metal oxides $^{124}Te^{16}O^+$ for $^{140}Ce$ among others. Light REEs (LREEs) (La—Sm) form a variety of polyatomic species which can interfere with heavy REEs (HREEs) (Eu—Lu) quantification such as $^{142}Nd^{16}O^+$ for $^{158}Gd$, $^{147}Sm^{16}O^+$ for $^{163}Dy$ and $^{149}Sm^{16}O^+$ for $^{165}Ho$. LREEs are more abundant compared to HREEs, making these polyatomic interferences more significant. Another type of spectral interference is inter-element interference and includes isobars and multiple charged ions. Some examples include $^{144}Sm$ for $^{144}Nd$, $^{158}Dy$ for $^{158}Gd$, and $^{168}Yb$ for $^{168}Er$. Multiple charged ions are an issue for Sc ($^{90}Zr^{2+}$, $^{135}Ba^{3+}$) and Y ($^{178}Hf^{2+}$).

For the screening approach developed here, the $^{144}Nd$ isotope was added to ICP-MS analyses to serve as a Q-STAR™. This isotope was specifically selected because this Nd isotope is the second most abundant isotope (23.8%) and does not suffer from significant oxide or other polyatomic species interferences. It does have an isobaric interference with $^{144}Sm$, but because the method is meant to screen for REEs rather than quantify Nd, this interference acts as a slight signal enhancement ($^{144}Sm$ abundance is 3.08%). Another potential atomic mass for screening would be $^{142}Nd$ (27.1% abundance), but it has a significant isobaric interference with $^{142}Ce$ (11.1% abundance). Moreover, the redox conditions may affect cerium solubility and influence cerium concentrations in water samples; therefore, $^{142}Nd$ is likely not the most robust way to screen for dissolved REEs. Additionally, $^{140}Ce$ is sometimes used as an internal standard and this use would skew screening values of natural samples. Other isotopes that could be used for REE screening such as $^{154}Sm$ and $^{154}Gd$, $^{164}Dy$ and $^{164}Er$ or $^{176}Yb$, $^{176}Lu$ and $^{176}Hf$ suffer from barium oxide interferences (154), LREE oxide formation (164) and the formation of other polyatomic species (176). More abundant isotopes such as $^{139}La$ (99.9%) and $^{140}Ce$ (88.4%) both suffer from polyatomic interferences from barium (Ba) hydride species as well as metal oxide formation. While much can be done on a sample-by-sample basis to overcome these effects and Ba can be monitored throughout analysis, this individualized approach is not time nor cost efficient when screening thousands of samples. By using an isotope with no oxide or polyatomic species interference, a greater number of samples can be screened rapidly prior to quantification. The addition of the 'analyte' 144 to the ICP-MS method adds only milliseconds to the instrumental runtime, with the data saved seamlessly with the routine analyte data. This technique utilizes the multianalyte functionality of ICP-MS with no impact to the instrumentation or quality of results.

Across the periodic table, REEs demonstrate similar geochemical behavior, and have been used as geochemical tracers in groundwater. REEs are typically present in the stable +3 oxidation state, although Ce and Eu can also be found in the +4 and +2 oxidation states respectively. Trivalent REEs also have similar ionic radii of about 1 Å, comparable to calcium ($Ca^{2+}$) and sodium ($Na^+$) but significantly larger than aluminum ($Al^{3+}$) and iron ($Fe^{3+}$). Like many trivalent cations, REEs are sensitive to a suite of geochemical conditions (i.e., pH, salinity, redox (Ce and Eu only) etc.), can be complexed with inorganic (e.g., $CO_3^{2-}$, $SO_4^{2-}$) and organic (dissolved organic carbon (DOC)) ligands and can be adsorbed to colloidal and mineral phases. Given that REEs behave as a cohesive geochemical group, using a single mass to charge ratio (m/z) to screen for REEs in water samples is feasible. This screening method not only allows for rapid approximation prior to more expensive and time intensive studies, but also can lead to the generation of large datasets that can be used to explore REE geochemistry and potential locations.

2. Materials and Methods

2.1 Data Cleaning and Aggregation

Thousands of water samples are analyzed annually, collected in support of various environmental studies. These samples include unfiltered and filtered water, acidified to increase metal constituent stability. These samples are analyzed via ICP-MS following standard procedures and associated quality control requirements yet REEs are not routinely included as analytes and as such REEs are sometimes used as internal standards following standardized USEPA (U.S. Environmental Protection Agency) methods. The current work is aimed to leverage the existing sample collection, preparation, and analysis efforts already underway to collect additional data for REEs, as described below, with essentially no additional burden on analysts or instrumentation.

An analyte having a mass to charge ratio (m/z) of 144 was added to the ICP-MS analyses in the metals unit. This m/z was specifically selected because the Nd isotope is the second most abundant and has an isobaric interference with Sm. Additionally, Nd is second only to Ce in terms of REE abundance in the Earth's crust, making it a strong candidate for use in high throughput screening. By intentionally selecting an isotopic mass that is sensitive (e.g., abundant) and has multiple REE signatures, the probability for REE detection is dramatically increased.

To determine the presence or absence of Nd in a sample, a counts per second (CPS) threshold was established by quantitatively measuring the net intensity in CPS of a Nd standard prepared from a certified standard solution (SPEX CertiPrep). The 0.1 μg/L standard was prepared from a 1 mg/L stock solution in triplicate. Based on these measurements, the CPS minimum threshold was set to 1,200 CPS when determining presence or absence of Nd. The screening level was established at 1,200 CPS Nd m/z 144, which is the instrumental response of a 0.1 μg/L Nd standard based on a calibration measured with a certified Nd ICP-MS standard. This study identified screening detections that produced positive REE results of 100% quantified Nd results (n=88 archived samples; n=9 field samples) at or above the 1,200 CPS screening level established.

A specific embodiment of the invention provides for an intensity measurement threshold level of equal to or greater than approximately 1,200 CPS as an optimal or a predetermined threshold level to identify the presence or the absence of at least one target analyte REE proxy and that of at least one REE to be identified or detected. The 1,200 CPS intensity measurement threshold was utilized since it represents about 0.1 μg/L concentration (e.g., ±10%, i.e., 0.09 to 0.11 μg/L) for the embodiment of the invention. The threshold level can be set at any optimal or predetermined level, either higher or lower than 1,200 CPS, to narrow or broaden a particular reconnaissance effort or scope to identify and/or detect REEs.

Data was analyzed for Nd m/z 144 "detects"; that is, counts per second greater than or equal to 1,200 measured by ICP-MS at m/z 144. The certified Nd standard used to establish the 1,200 CPS threshold was analyzed by ICP-MS in a 0.4% nitric acid matrix.

The minimum CPS from the triplicate measurements of the 0.1 μg/L standard was selected opposed to the average value (1,442±197 CPS) to allow for any potential deviation from the average due to instrument fluctuations over time (e.g., maintenance, specific daily tuning, etc.). Therefore, the lowest concentrations considered to be indicative of REEs fall slightly below of the 0.1 μg/L concentration but within the 1,200 CPS threshold. This threshold is expected to vary over time, and an initial calibration curve should be analyzed on each individual instrument to establish an ideal threshold. The maximum CPS was not limited because this screening method is a precursor to quantitative analysis and intended to be primarily qualitative, primarily determining a presence or absence of Nd, and concentrations from screening are only reported as estimations.

FIG. 1 shows a graphical plot of a measured Nd calibration curve. Samples were prepared from a SPEX CertiPrep 1 mg/L solution and measured in triplicate. Error bars represent the standard deviation between triplicate samples. This calibration curve was used to estimate Nd concentrations in all test samples from digitally panned or screened dataset. These estimated concentrations of Nd were used alongside reported concentrations for other elements in statistical analyses described herein.

While the upper limit of the calibration curve was 300,000 CPS, the maximum CPS was not limited in this presence/absence analysis. From this initial calibration curve, the relationship between concentration and CPS was used to calculate an estimated Nd concentration for samples analyzed from April 2021 to May 2022 (n=12,857). No adjustments in this calibration were made to account for instrument drift, deviations in matrix effects, examined in relation to any internal standard or maintenance that occurred over the one-year test period. Therefore, it is imperative to view this method as a screening tool as opposed to a quantitative method.

Figure 2:
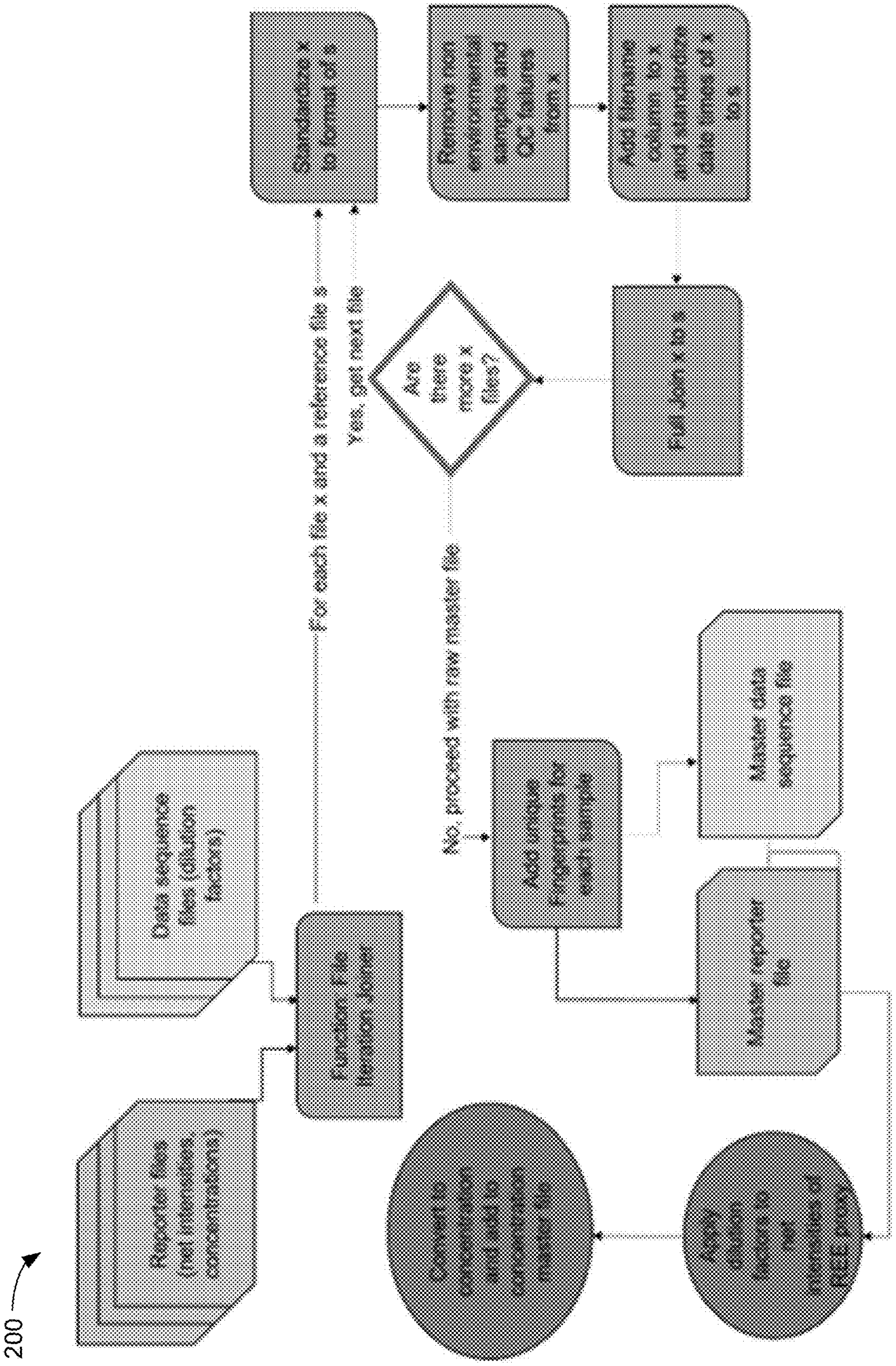
FIG. 2 is a flow diagram illustrating an example of a data pipeline for cleaning and aggregating ICP-MS data.

FIG. 2 is a flow diagram illustrating an example of a data pipeline for cleaning and aggregating ICP-MS data. Data was aggregated using the programming language R (version 1.3.959) for samples analyzed in the metals unit via the data pipeline. Briefly, reporter files containing raw intensities of each ICP-MS batch were collected along with data sequence files which contained any dilution factors that needed to be applied. The data was cleaned and joined using a file joiner function created in R and only dissolved water (0.45 μm filtered) samples were considered, although the technique and the methods of the invention are also applicable to whole water samples. Quality control failures (i.e., samples in which internal standard values were outside an acceptable range) were removed and samples without a verifiable environmental site in the USGS National Water Information System (NWIS) database were excluded from further consideration in the digital/screened dataset.

Employing the ICP-MS data cleaning and aggregating process 200, data were aggregated using the programming language R (version 1.3.959) for samples analyzed via the pipeline outlined in FIG. 2. Briefly, reporter files containing raw intensities of each ICP-MS batch were collected along with data sequence files which contain any dilution factors that needed to be applied to CPS values if samples were diluted prior to analysis. The data were cleaned and joined using a file joiner function created in R and only filtered, defined here as <0.45 μm filtered water samples, were considered, though in theory this technique is also applicable to unfiltered water samples as well as solid sample digestates. Quality control failures, or samples in which internal standard values were outside an acceptable range, were removed. Samples without a verifiable environmental site in the USGS National Water Information System (NWIS) database were excluded from further consideration in the screened dataset, leaving only 6,626 filtered samples. Each sample in the screened dataset was identified with a sample identification number, which aligns with a site or station number. Station numbers corresponding to each sample identification number were gathered. Spatial coordinates and corresponding locations of these station numbers were found using the National Water Information System (NWIS) database via the R DataRetrieval package. Estimated Nd concentrations were plotted with spatial coordinates using Arc GIS Pro 2.91.

FIG. 3 shows a table of quality assurance/quality control (QA/QC) values from digitally panned dataset for samples having Nd detects and comparison to original sample. Data were selected based on an established 1,200 CPS threshold into a separate file and classified as detects. Detects that were analytical duplicates (MDUP), analytical spikes (MSK) and analytical duplicate spikes (MSPK) were further separated and characterized as quality assurance/quality control (QA/QC) for detects, as seen in the table. Dilution factors were applied to net intensities of m/z=144 values≥1,200 CPS since this analyte was not part of the typical quantitative analytical suite. The dilution factors for other elements were applied by analysts and the final values reported in concentrations were dilution corrected concentrations. Dilution corrected net intensities of m/z=144≥1,200 CPS were converted to estimated concentrations in μg/L using the initial calibration curve measured in 2021 (FIG. 1).

2.2 Site Identification

Each sample in the digital dataset was identified with a sample identification number, which aligned with a site or station number. Station numbers corresponding to each sample identification number were gathered. Spatial coordinates and corresponding locations of these station numbers were found using the National Water Information System (NWIS) database via the R DataRetrieval package. Only the 6,626 dissolved samples with spatial information were considered in the mapping and statistical analyses of the digital dataset since the locations of the remaining samples could not be verified.

2.3 Confirmation of Detections

Figure 4:
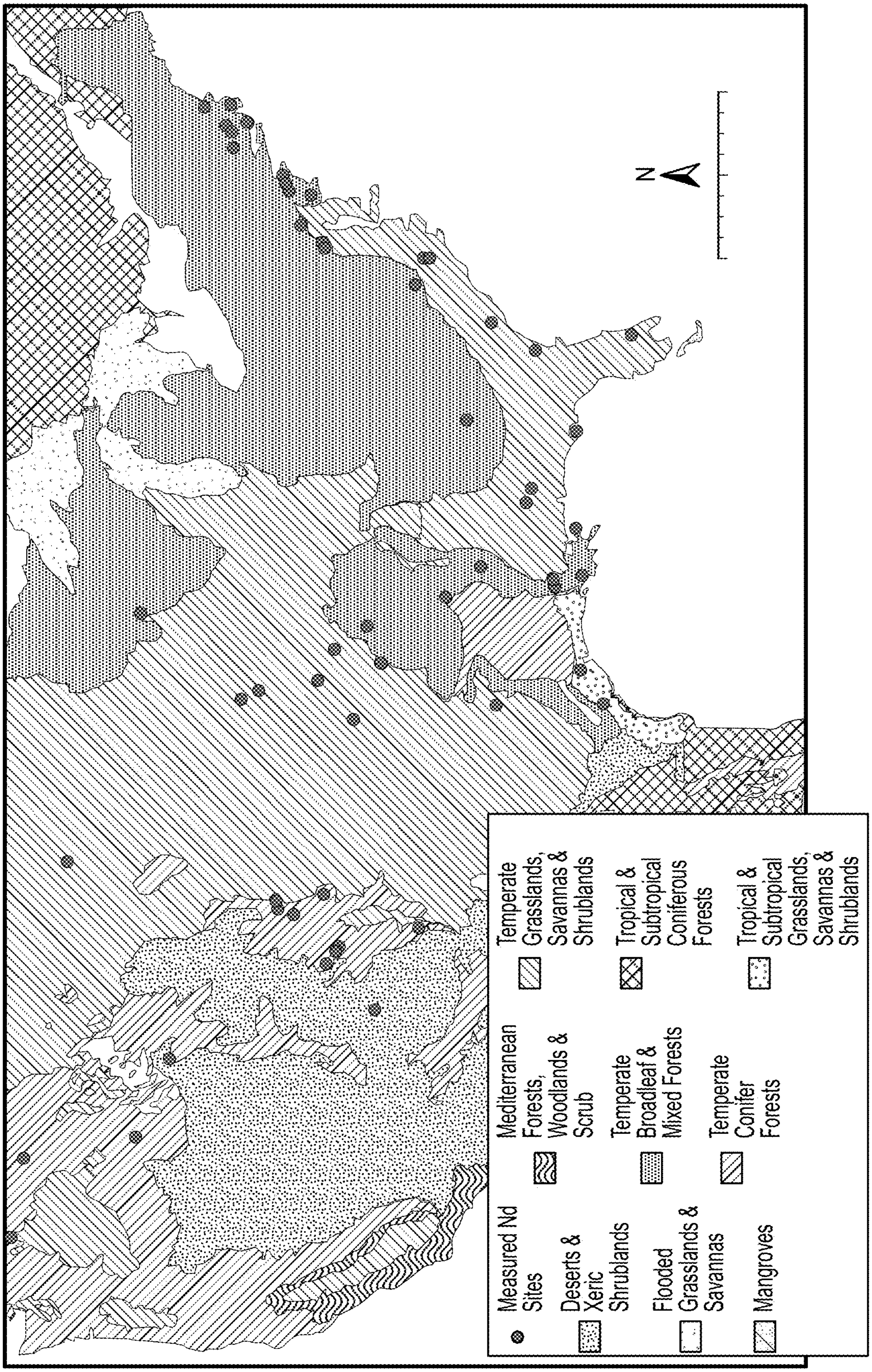
FIG. 4 shows sample locations from the environmental samples used in the quantitative measurements of the archived subset with public information.

A subset of 88 archived samples was randomly selected for quantitative REE analysis to validate the screening method. These samples came from a variety of biomes and ecoregions. FIG. 4 shows sample locations from the environmental samples used in the quantitative measurements of the archived subset with public information. Nine (9) of the samples were non-environmental samples and one (1) sample does not have publicly available latitude and longitude coordinates. Nine of these samples, however, were laboratory-based samples but were nevertheless analyzed to help determine the validity of the screening analysis. Nd concentrations were predicted to be between 0.08-124 μg/L, with an average concentration of 2.6 μg/L. Quantitative analysis was performed and 76 archived samples were analyzed via ICP-MS and inductively coupled plasma optical emission spectroscopy (ICP-OES). It must be noted, some differences in concentration are expected due to variations in instruments between the different laboratories. Samples from 2021 and 2022 were analyzed. While some exceeded recommended storage times, the analysis merely confirms the presence of REEs in these samples and though exact concentrations may change over time, it is unlikely REEs will precipitate or otherwise change concentrations significantly in filtered, acidified samples and precipitation was not visually observed in any sample analyzed. A set of 39 randomly selected samples with m/z=144 values less than 1,200 CPS from across the U.S. and three non-environmental (i.e., laboratory-based) samples were also analyzed to confirm either absence of REEs or values below 0.1 μg/L (see FIG. 21 and table in FIG. 6). Samples with values below 1,200 CPS were chosen to test the presence/absence limitations of the screening method.

Figure 5:
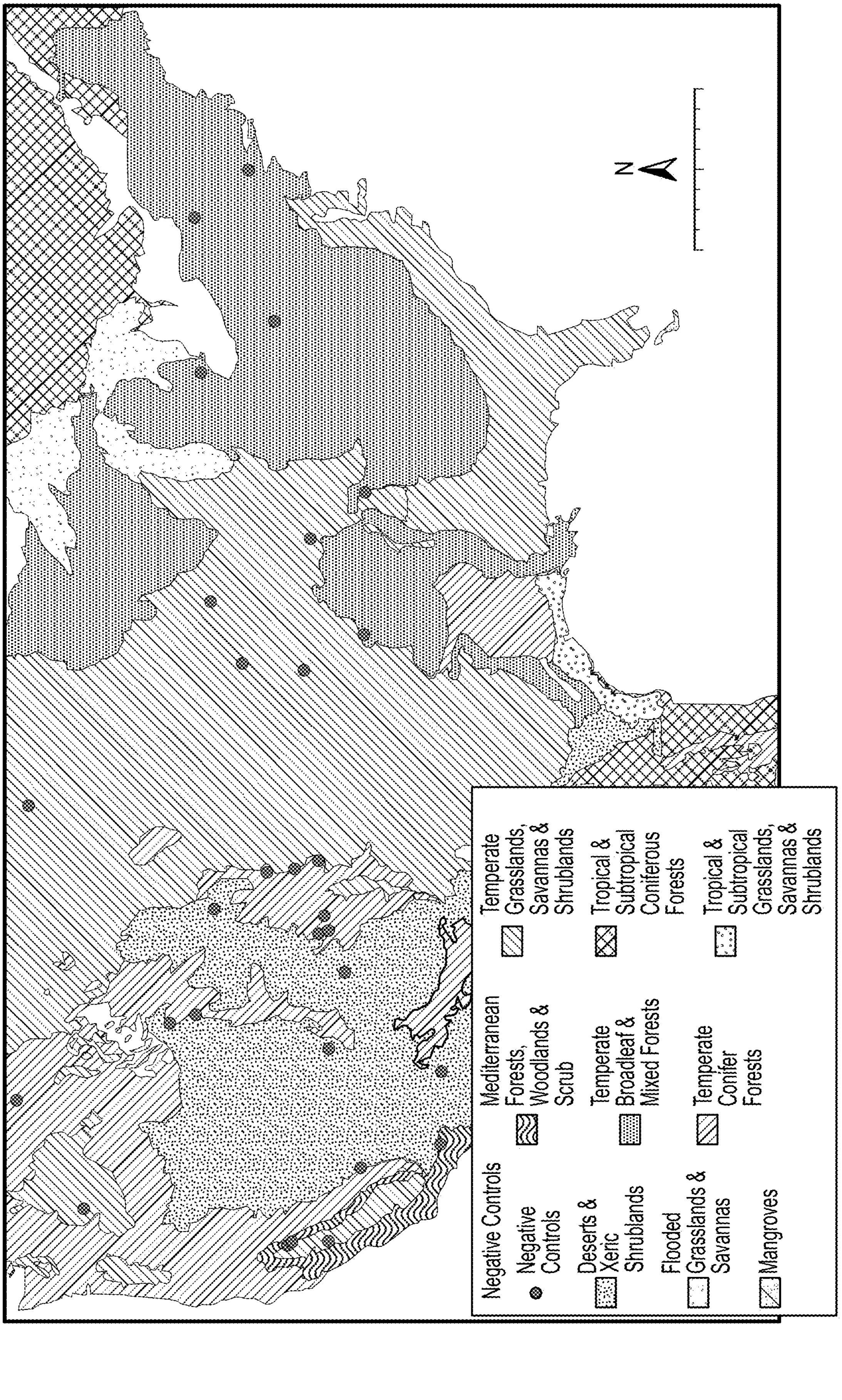
FIG. 5 shows sample locations from the 36 environmental samples used to assess Nd concentrations with CPS less than 1,200.

FIG. 5 shows sample locations from the 36 environmental samples used to assess Nd concentrations with CPS less than 1,200. The other three samples were non-environmental samples. FIG. 6 shows a table of REE values for a subset of samples used for negative controls. The sample identification number is used and information about this sample is therefore searchable through the internal database. The Nd counts per second (CPS) is the value obtained via digital panning and only samples with values less than 1,200 CPS were selected.

In addition to confirmation of detections, Nd was also measured quantitatively and with Q-STAR™ in the USGS fall 2023 trace metal standard reference sample (SRS) T-255. T-255 was prepared using surface water collected from North Fork of Snake River near, Keystone, Colorado (39° 36' 43" N, 105° 56' 22").

Figure 7:
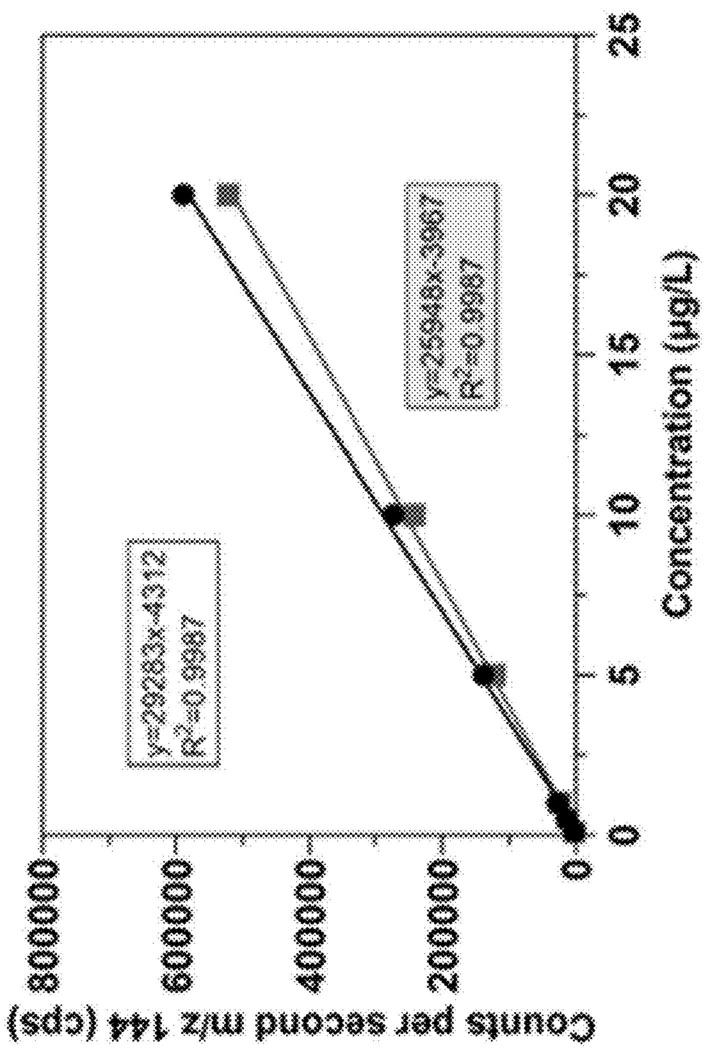
FIG. 7 shows a graphical plot of Nd m/z=144 calibration curves measured using Spex Certi Prep Multi-Element Solution 1 (CLMS-1).

The sample was tested with Q-STAR™ and a specific calibration curve was initially prepared because Q-STAR™ is instrument specific. FIG. 7 shows a graphical plot of Nd m/z=144 calibration curves measured using Spex Certi Prep Multi-Element Solution 1 (CLMS-1). This solution is a mixture of elements including Nd and Sm and therefore data are shown with (green squares) and without (black circles) the Sm correction for Nd. From this calibration, the slope of the linear regression was used to estimate Nd in USGS standard reference sample SRS T-255, just as with the screened dataset. The solution used for the calibration curve was a Spex Certi Prep Multi-Element Solution 1 (CLMS-1) solution and, therefore, Q-STAR™ results are shown both with and without the Sm correction because this was not a pure Nd solution. FIG. 8 shows a Table of Nd results of USGS Standard Reference Sample T-255 analysis both quantitatively and using Q-STAR™. Q-STAR™ values are estimated from the slope of the linear regression created with a multi-element standard solution. As mentioned, Q-STAR™ values are shown with and without the Sm correction.

2.4 Targeted Field Sampling

Using the NWIS database, 356 unique sample locations with REE detections were determined. Owing to feasibility, nine field sites were targeted for confirmatory water sampling. All water samples taken were surface water samples, though detections in groundwater samples were also observed in the digitally panned/screened dataset. Two sites in Estes Park, CO were sampled and four sites in Colorado Springs, CO were sampled. One site in Leland, MS and two sites in Vicksburg, MS were sampled. Duplicate water samples taken at the CO sites and single samples taken at the MS sites were filtered with 0.45 μm filters for dissolved trace metal analysis. Trace metal samples were acidified with 1% by volume nitric acid and stored in trace metal clean polypropylene bottles. ICP-MS analysis was performed, with the same QA/QC as in the companion data release and elsewhere.

2.5 Statistical Data Analysis

Non-parametric analyses were selected for these datasets due to the non-normal distribution of data. Namely, the use of Spearman rank correlation was selected for investigating elemental relationships. Correlation matrices were calculated using the R package Hmisc and rho (ρ) values from these relationships are shown in two tables.

3. Results and Discussion

The digitally panned/screened data, archived samples, and fresh environmental samples collectively demonstrate the utility of the m/z=144 as not only a strong proxy for Nd and other REEs but also as a high throughput semi-quantitative screening method provided by the invention. Quantitative analysis of REEs via ICP-MS can be costly and time consuming due to a variety of spectral interferences, oxide formations, and low concentrations of REEs, especially HREEs. Using the screening method of the invention offers the ability for analysts to focus efforts on samples of interest, as opposed to entire sample sets which could bear fruitless results. The use of the screening method of the invention in these data leads to mapping of dissolved water REE concentrations, highlighting potential locations for further investigations.

3.1 Data Validation from SRS T-255 and Archived Subset

In the USGS T-255 standard reference sample, Nd quantitatively measured was 0.105±0.002 μg/L, which is a 11.6% difference compared to the reported value of 0.118 μg/L. Some variability is expected from instrument to instrument and in fact the interlaboratory comparison results show a 0.1-0.124 μg/L range. Using Q-STAR™, predicted Nd values are 0.099±0.003 μg/L without the Sm correction and 0.109±0.003 μg/L with the Sm correction (FIG. 8). This difference with and without the Sm correction demonstrates the importance of the Sm correction when the initial calibration is performed with a multi-element solution compared to the pure Nd solution used in the calibration curve (FIG. 3). Using the Sm correction, the Q-STAR™ predicted Nd value is 8% different than the reported value and without it the Q-STAR™ prediction is 17% different. These results demonstrate the effectiveness of Q-STAR™ as a semi-quantitative presence/absence screening tool and how it can be applied to multiple ICP-MS instruments.

All 88 archived samples that were analyzed for REEs and compared to the estimated $^{144}$Nd results had measurable REE concentrations, not only of Nd but also of La, Ce, Pr, Sm, Gd, and Y. Environmental samples (n=79) also had measurable concentrations of Eu, Tb, Dy, Ho, Er, Tm, and Lu. Yb was only quantified in 76 samples. The lowest concentration of Nd measured was 0.06 μg/L and overall, a total of 7% of samples fell below the 0.1 μg/L estimated threshold; however, Nd was still quantified in the 0.06-0.1 μg/L range. Upon quantification of the archived samples, 72 environmental samples followed the Oddo-Harkins rule, which states elements with an even atomic number (Ce, Nd, Sm, Gd, Dy, and Er) are more abundant than elements with an odd atomic number (La, Pr, Eu, Tb, Ho, Tm and Lu), as is expected for geogenic samples that contain REEs. The Oddo-Harkins rule was maintained using either measured concentrations of Nd or Q-STAR™ estimated Nd values. This behavior confirms that the m/z=144 'analyte' is not only a good indicator of Nd, but also for determining the presence/absence of geogenic REEs in filtered water samples because the elements follow one of the expected abundance patterns. That archived samples followed the Oddo-Harkins rule suggests REEs in these samples are likely geogenic and demonstrates the screening method is applicable to geogenic REE bearing samples. However, it must be noted that water samples can have different abundance patterns, and that anomalies may occur. For example, if negative Ce anomalies resulting from $CeO_2$ precipitation in measured samples were observed, these could still be considered geogenic samples.

Figure 9:
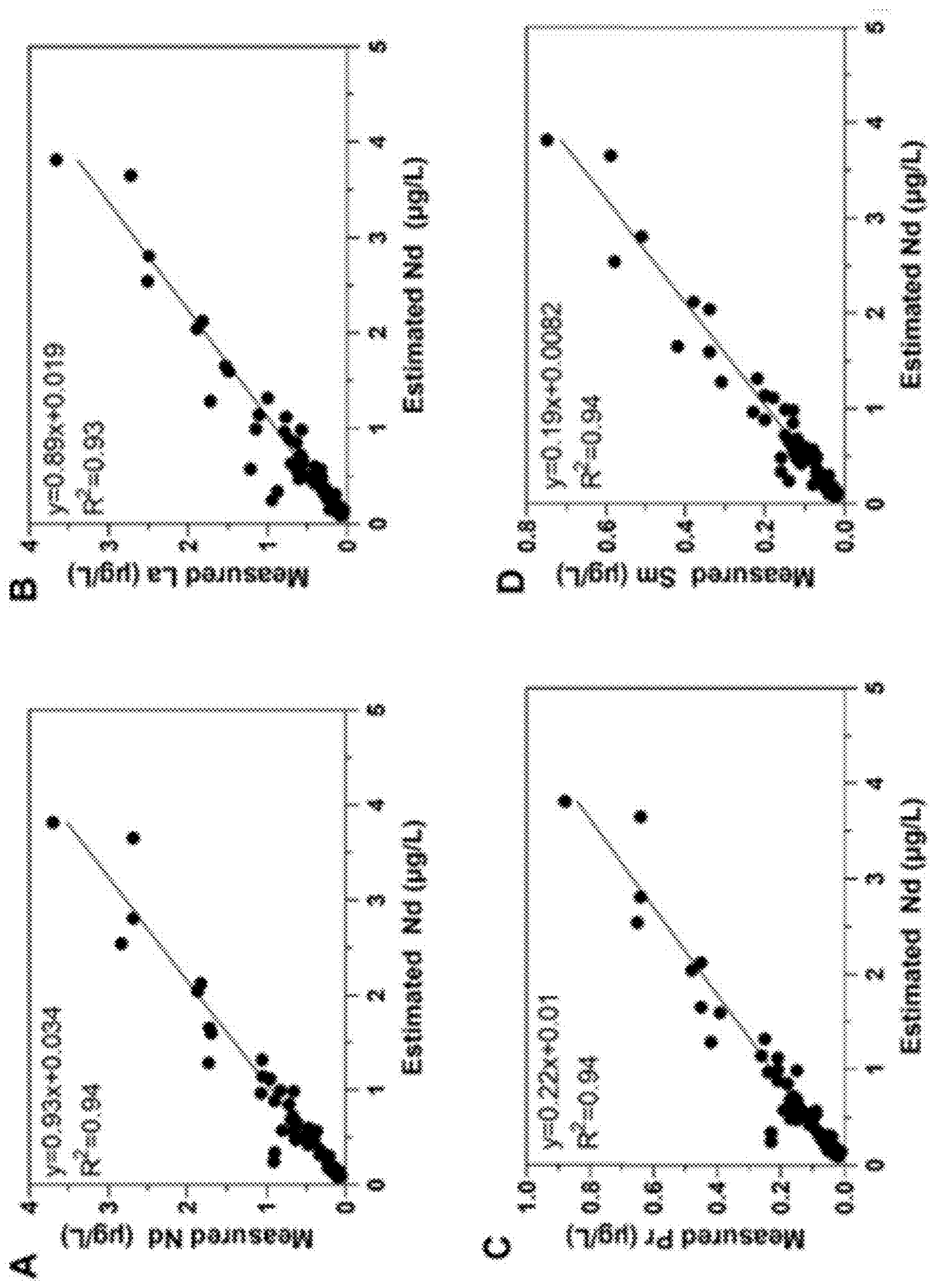
FIG. 9 shows graphical plots of measured (A) Nd, (B) La, (C) Pr, and (D) Sm versus predicted Nd from a subset of archived samples (n=86 as shown here).

Results of this work suggest that screening filtered water samples for REEs with m/z=144 is promising. Measurement of archived samples demonstrated excellent agreement between estimated and measured values, with linear determination coefficients ($R^2$) values above 0.9 for not only Nd but La, Pr and Sm as well. FIG. 9 shows graphical plots of measured (A) Nd, (B) La, (C) Pr, and (D) Sm versus predicted Nd from a subset of archived samples (n=86 as shown here). Linear regression was performed in R.

Figure 10:
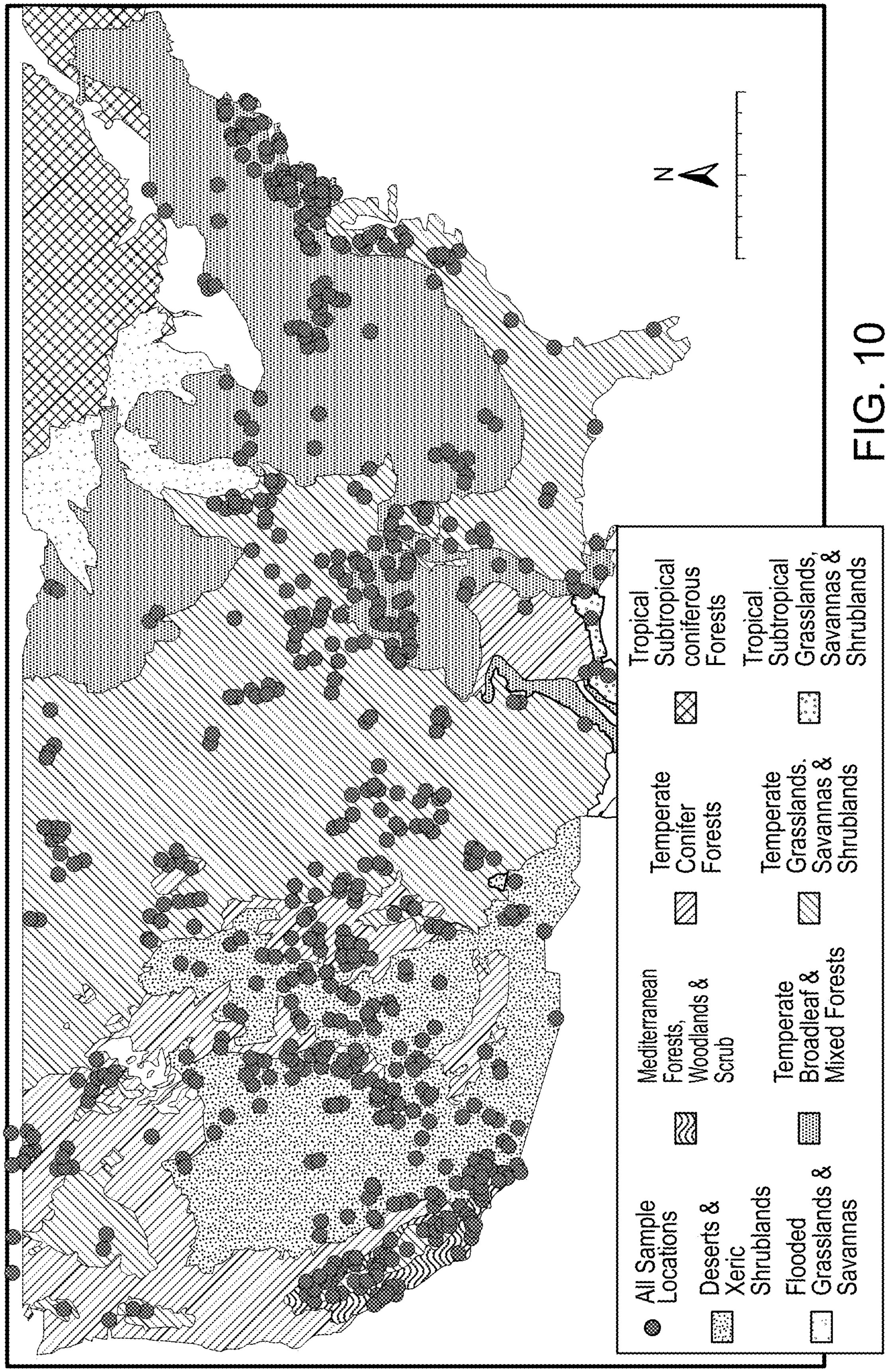
FIG. 10 shows a map demonstrating where all samples originated from in the screened dataset.
Figure 11:
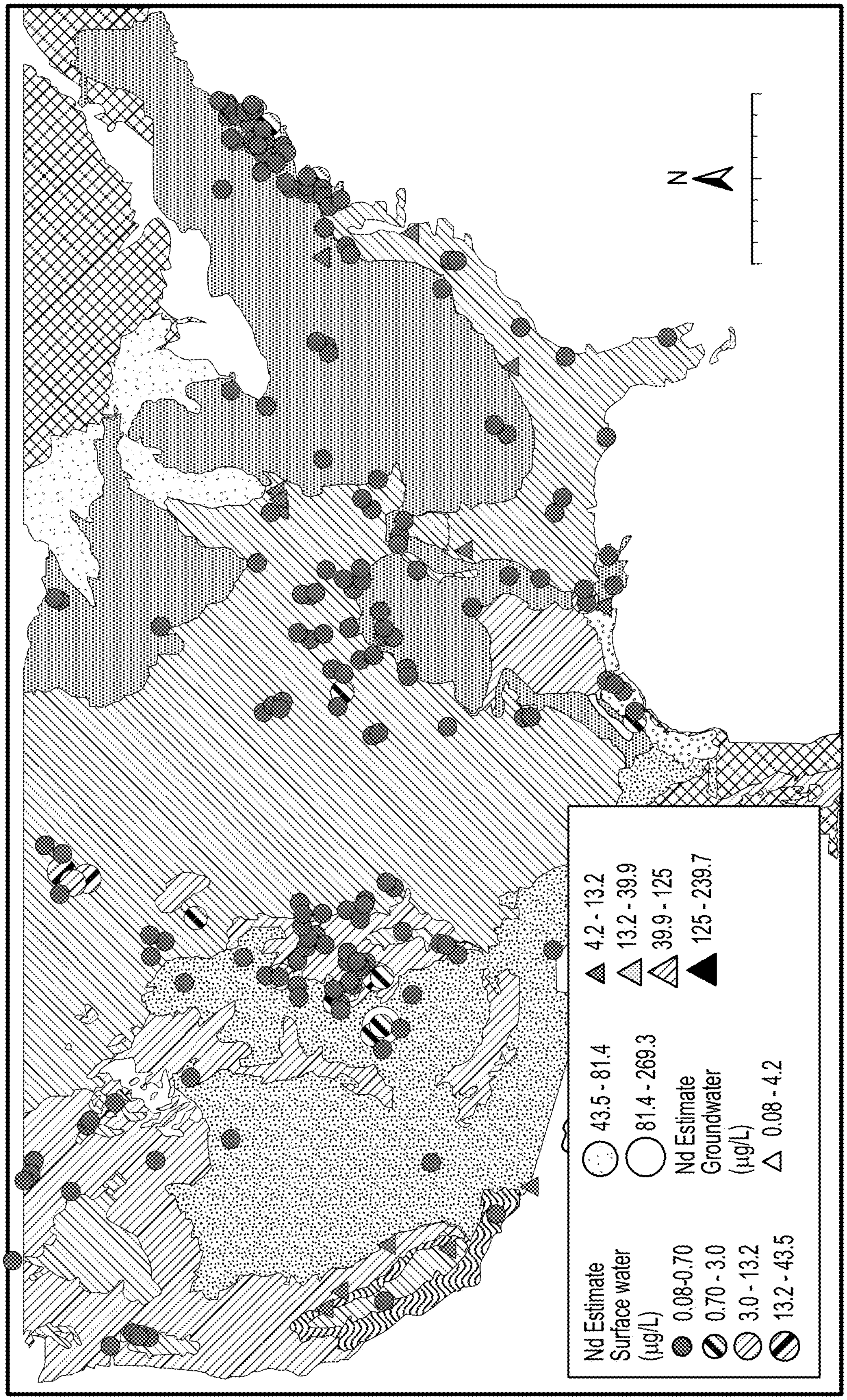
FIG. 11 shows a map demonstrating where detections were determined.

FIG. 10 shows a map demonstrating where all samples originated from in the screened dataset. FIG. 11 shows a map demonstrating where detections were determined. In panel B, surface water detections are shown in circles proportional to estimated Nd concentrations (μg/L) and groundwater detections are shown in triangles also proportional to estimated Nd concentrations (μg/L). Underlying biomes are also shown using the RESOLVE data base available through ArcGIS hub. Multiple detections may be present at the same sites and some symbols are therefore overlayed at a single site.

Figure 12:
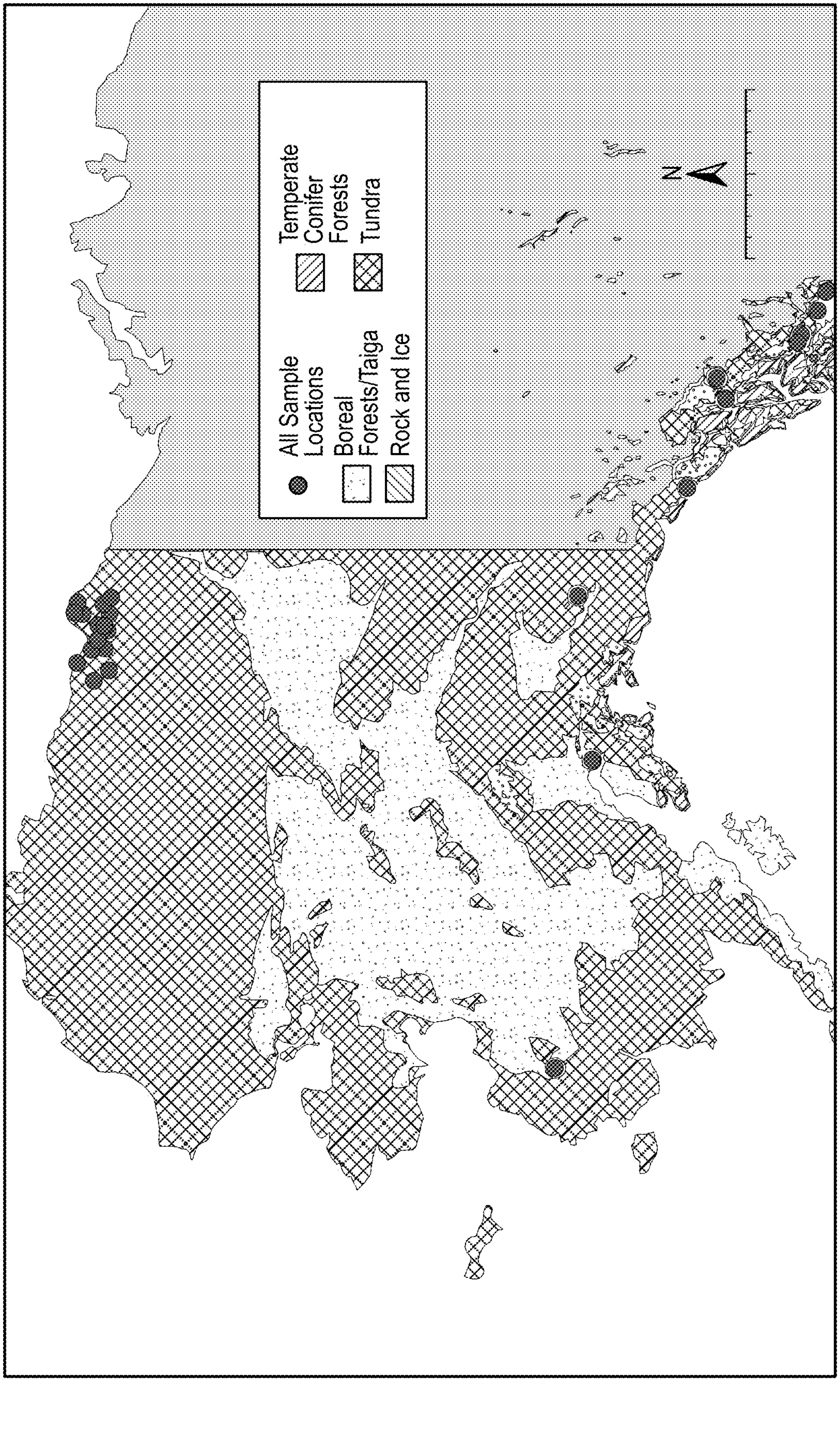
FIG. 12 shows a map of all available sample site information for Alaska sites.
Figure 13:
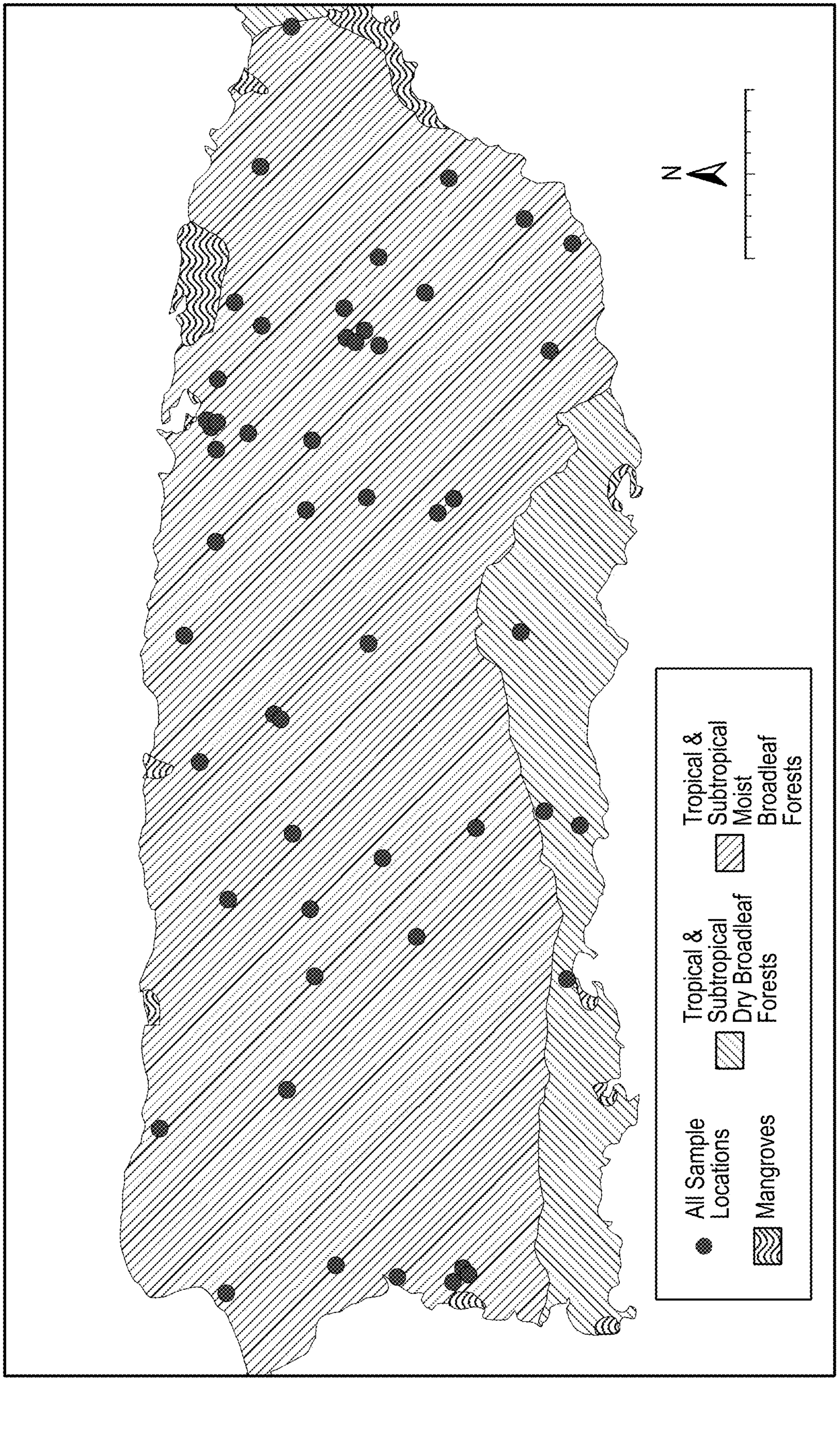
FIG. 13 shows a map of all available sample site information for Puerto Rico sites.
Figure 14:
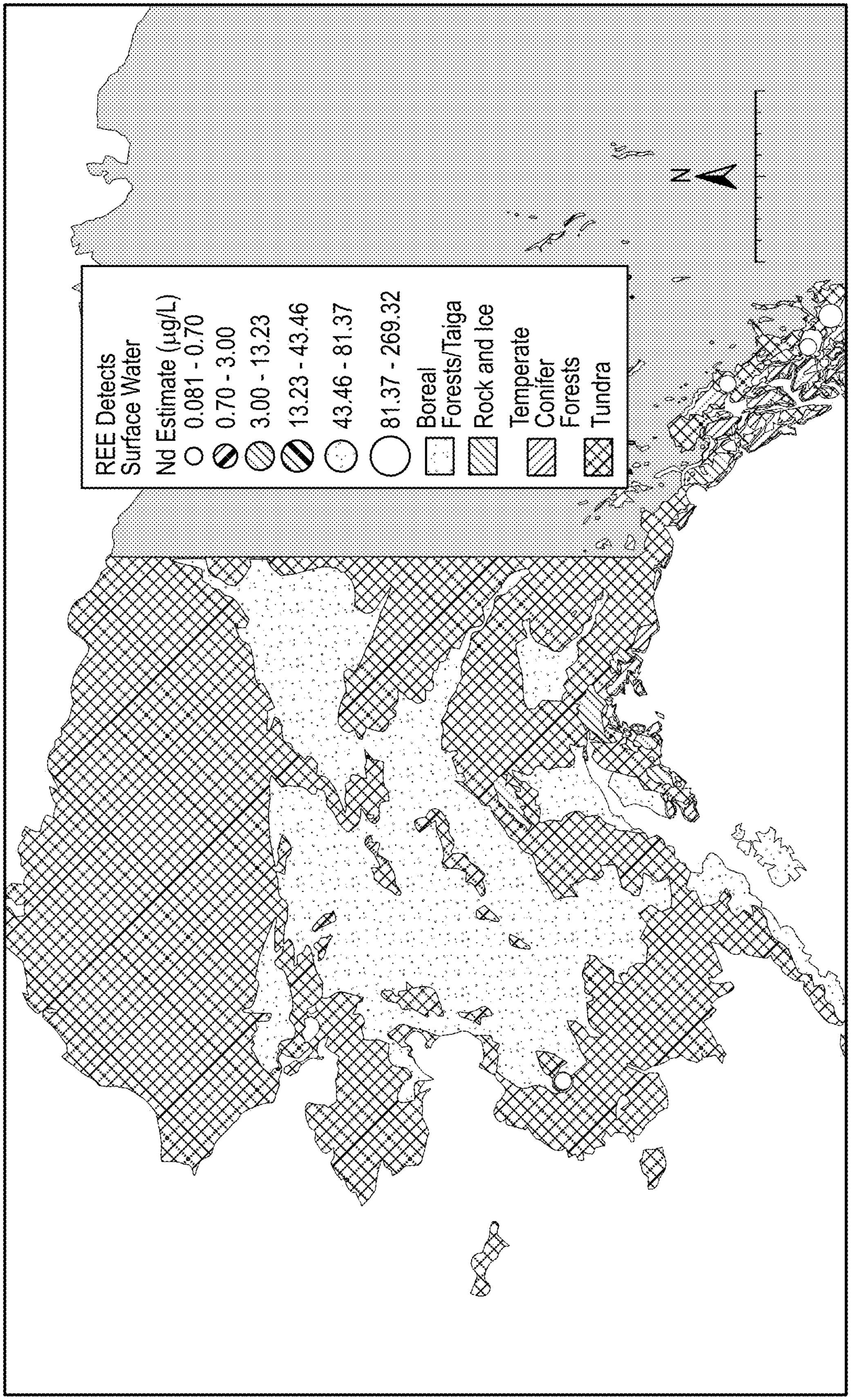
FIG. 14 shows a map of average estimated Nd concentrations (μg/L) at Alaskan sites.
Figure 15:
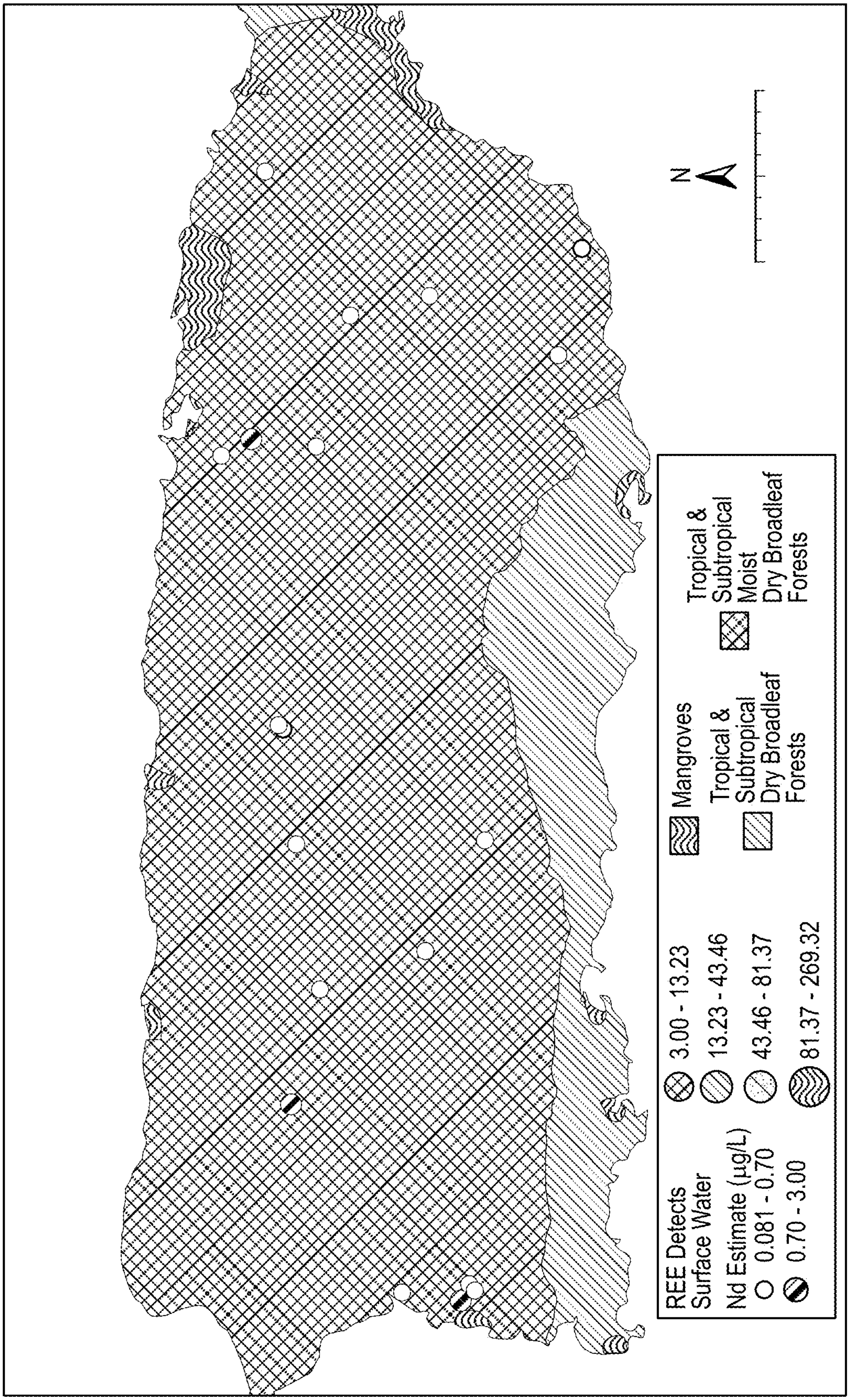
FIG. 15 shows a map of average estimated Nd concentrations (μg/L) at Puerto Rico sites.

FIG. 12 shows a map of all available sample site information for Alaska sites. FIG. 13 shows a map of all available sample site information for Puerto Rico sites. FIG. 14 shows a map of average estimated Nd concentrations (μg/L) at Alaskan sites. FIG. 15 shows a map of average estimated Nd concentrations (μg/L) at Puerto Rico sites. Maps for Alaska and Puerto Rico demonstrating where samples originated from in the screened dataset are shown in FIGS. 12 and 13 and where detections were determined in FIGS. 14 and 15.

Figure 16:
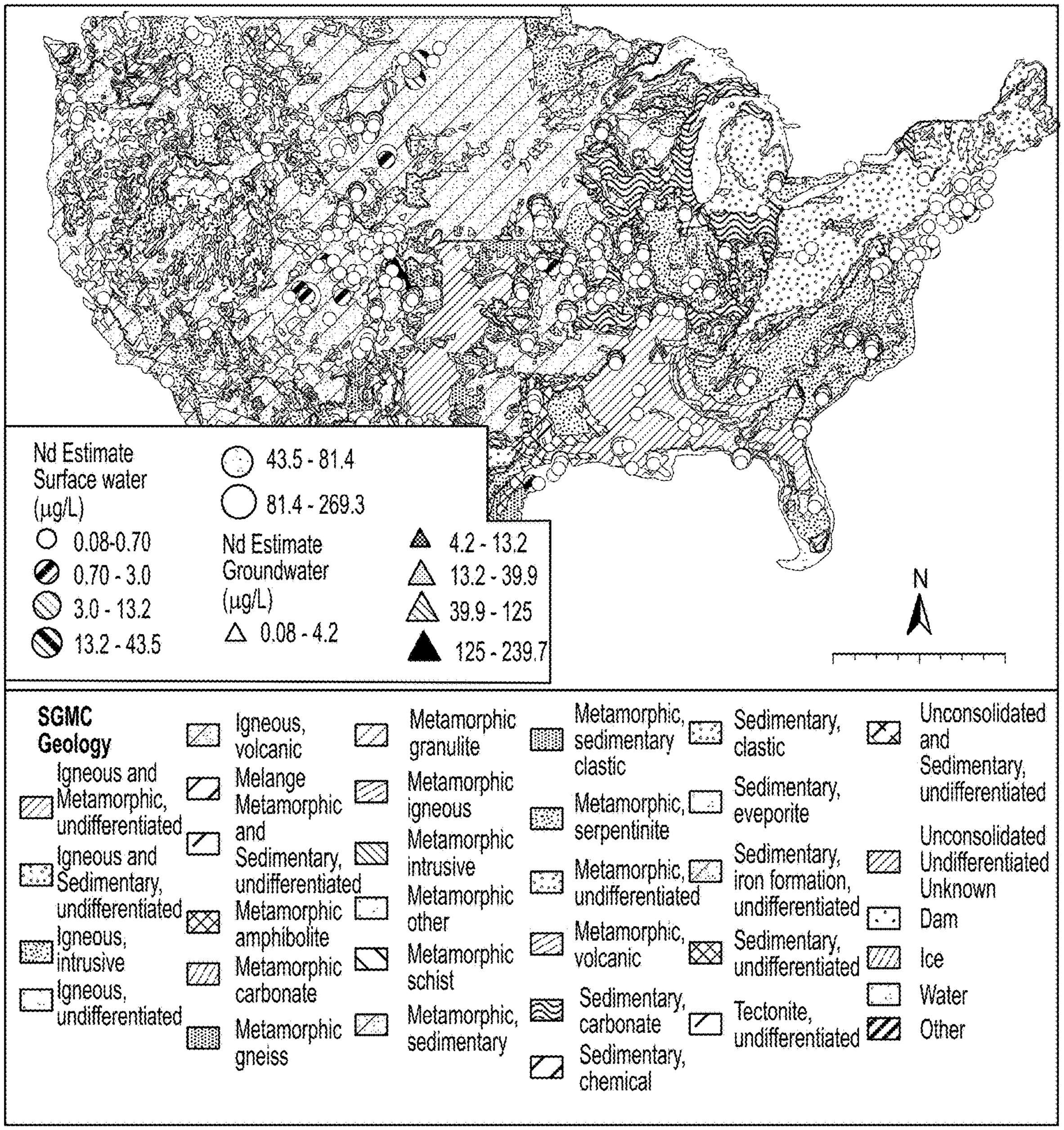
FIG. 16 shows a map of REE detects via the screening method overlaid with underlying geology, as described by the State Geologic Map Compilation (SGMC) geodatabase.
Figure 17:
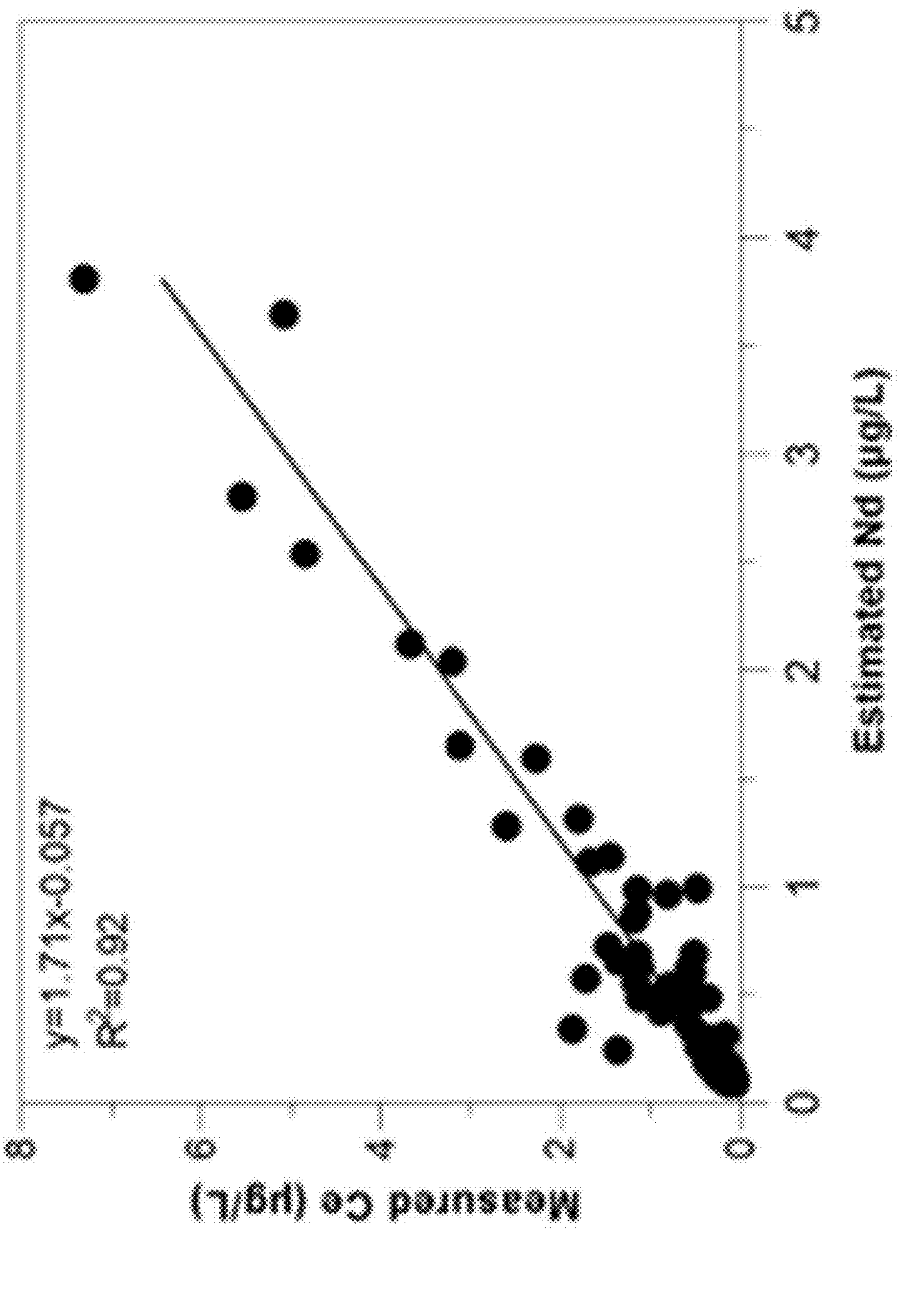
FIG. 17 shows Measured Ce versus predicted Nd from a subset of measured samples used in digital panning.

FIG. 16 shows a map of REE detects via the screening method overlaid with underlying geology, as described by the State Geologic Map Compilation (SGMC) geodatabase. Detections are shown in the same scaling as in FIGS. 10 and 11, with circles being surface water detections and triangles being groundwater detections. The determination coefficients ($R^2$) values and equations of the lines are shown. Screening filtered water samples over the course of one-year generated 1,215 detections of $^{144}$Nd across the U.S. (FIGS. 10 and 11) from a variety of ecoregions and with differing underlying geology (FIG. 16). Concentrations were in the range of 0.06-269 μg/L and while these are not economically viable, some concentrations are significantly elevated and above expected background concentrations reported. Specific results are discussed below.

A linear relationship exists between estimated Nd and measured Nd from 0.08-4 μg/L, with $R^2$=0.94 and a slope (m) of 0.93, demonstrating a near 1:1 correlation (n=86) (FIG. 9, view (A)). The lower limit used for the estimated Nd was established from use of Q-STAR™ as described in the methods section; however, the performance of Q-STAR™ below 0.08 μg/L is reported in FIG. 6. The determination coefficient increases slightly to $R^2$=0.98 (n=88) when the maximum concentration is extended to 130 μg/L, adding the two measured samples with the highest concentrations. At the lower concentration range (0.08-0.7 μg/L) the relationship is not as strong with an $R^2$=0.9 (n=63), with overestimation being more common at lower concentrations. Higher variability is to be expected as concentrations approach the typical detection limit for ICP-MS below 0.02 μg/L. To further illustrate the validity of the screening method, linear relationships between estimated Nd and other measured REEs (La, Pr, Sm), which are expected given the similarities in geochemical behavior, are also shown (FIG. 9, views (B), (C), and (D)).

Figure 18:
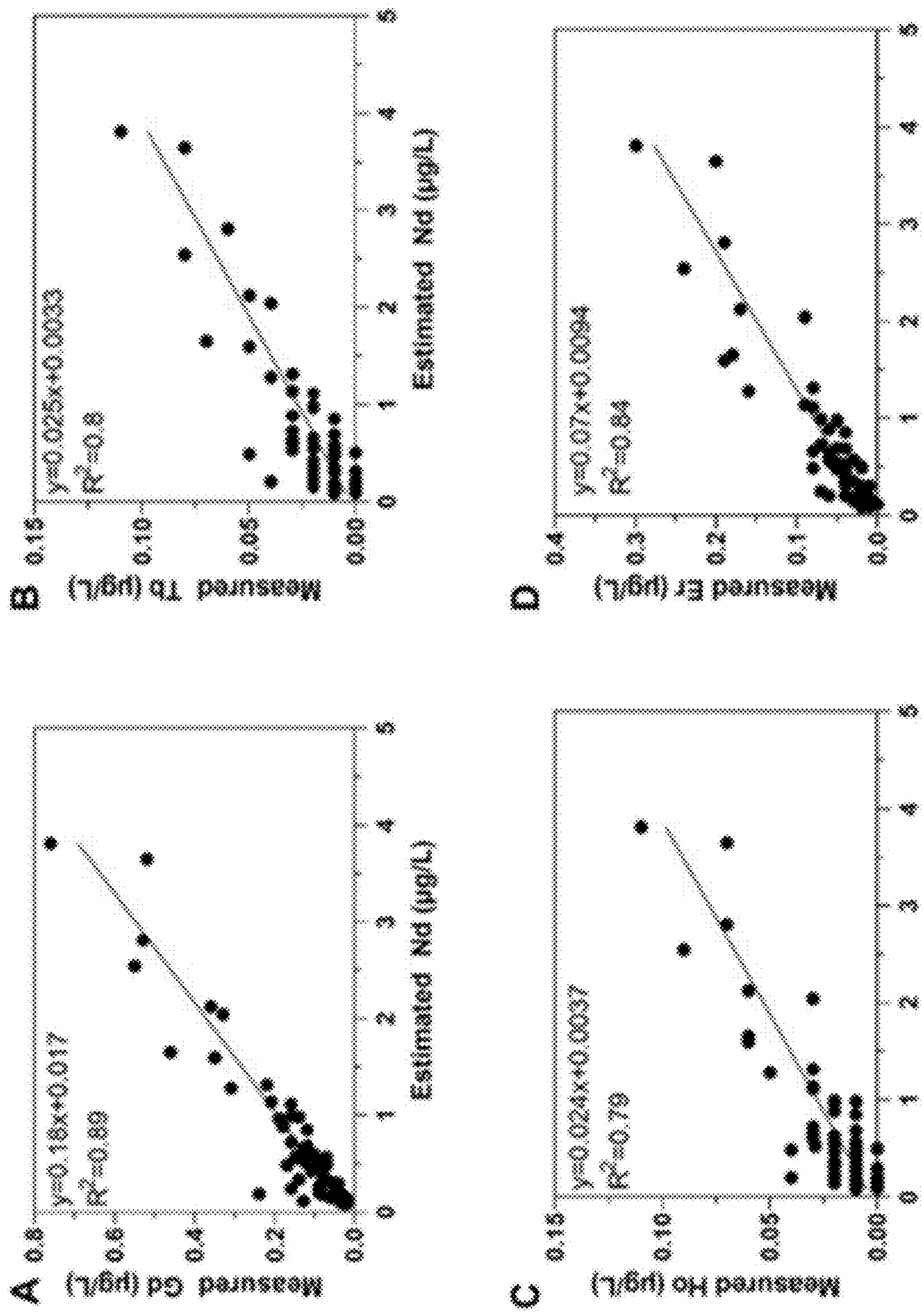
FIG. 18 shows measured (A) Gd, (B) Tb, (C) Ho, and (D) Er versus predicted Nd from a subset of measured samples used in digital panning.

From 0.08-4 μg/L, a distinct linear relationship exists between estimated dissolved Nd and LREEs: La ($R^2$=0.93; m=0.89), Pr ($R^2$=0.94; m=0.22), Sm ($R^2$=0.94; m=0.19), and Ce ($R^2$=0.92; m=1.71) (FIGS. 9 and 18). The slopes of these linear regressions can be compared to elemental ratios calculated from the Upper Continental Crust (UCC) values and elsewhere. FIG. 18 shows Measured Ce versus predicted Nd from a subset of measured samples used in digital panning. Linear regression was performed in R and the correlation coefficients ($R^2$) values are shown. Values demonstrates an average 17.9% difference between UCC calculated ratios and slopes from Q-STAR™ predicted Nd vs measured REEs (excluding Tm, Yb, and Lu). This comparison further demonstrates that estimating Nd concentration using Q-STAR™ is a reliable method for predicting the presence of geogenic Nd in filtered water samples because slope values are on average less than 20% different than expected UCC ratios. The lowest percent difference is for Tb:Nd followed by Dy:Nd, with 7.4% difference and the highest percent difference is between Ce:Nd, with a 36%

(again excluding Tm, Yb, and Lu). The largest percent difference being between Ce and Nd is not unexpected, as the UCC composition value of Ce is reported as 64 mg/kg compared to 26 mg/kg for Nd. Furthermore, Ce(IV) may limit the solubility of Ce, via precipitation of $CeO_2$ and/or adsorption of Ce(IV) on particulates that may be removed during filtration, and therefore, by using Nd as a Q-STAR™ in dissolved waters, Ce is likely to be underestimated. While these redox driven depletions may occur to some degree in the natural waters analyzed here, a negative Ce anomaly would be expected if Ce(VI) precipitation was extensive, and this was not observed in measured archived samples. It is hypothesized this difference in Ce:Nd compared to the UCC value may also be attributed to the vast spatial and thus geologic variability in the samples analyzed (FIGS. 10, 11, and 16). When elemental ratios of measured REE to predicted Nd are compared to other references such as the North American Shale Composite, World Shale Average, Post Archean Australian Shale and average chondrites, the values are within the expected ranges calculated from these five different standards for Ce (1.58-2.46) and all other REEs.

HREE relationships are also linear where detectable concentrations were observed, with $R^2$ values of Gd ($R^2$=0.89; m=0.18), Tb ($R^2$=0.8; m=0.025), Ho ($R^2$=0.79; m=0.025), and Er ($R^2$=0.84; m=0.070). FIG. 18 shows measured (A) Gd, (B) Tb, (C) Ho, and (D) Er versus predicted Nd from a subset of measured samples used in digital panning. Linear regression was performed in R and the determination coefficients ($R^2$) values are shown. These heavier elements were generally measured in much lower concentrations, on the order of 0.01 μg/L or 10 ng/L, pushing the quantification limits of ICP-MS. Lower concentrations of HREEs are expected based on typical REE abundances, with LREEs being more common in the earth's crust and HREEs being relatively less abundant. As such, Q-STAR™ is not as good of a predictor of some HREEs analyzed, Tm, Yb and Lu, with 42, 43, and 50% differences between ratios calculated from upper continental crust content and m values of 0.0083, 0.055, and 0.0075 respectively. Results demonstrate the ability of the method to identify REE enriched waters and this information may be used for resource exploration despite Q-STAR™ not providing insight into exact concentrations of all REEs for all occurrences.

3.2 Detections From the Screened Dataset

Figure 19:
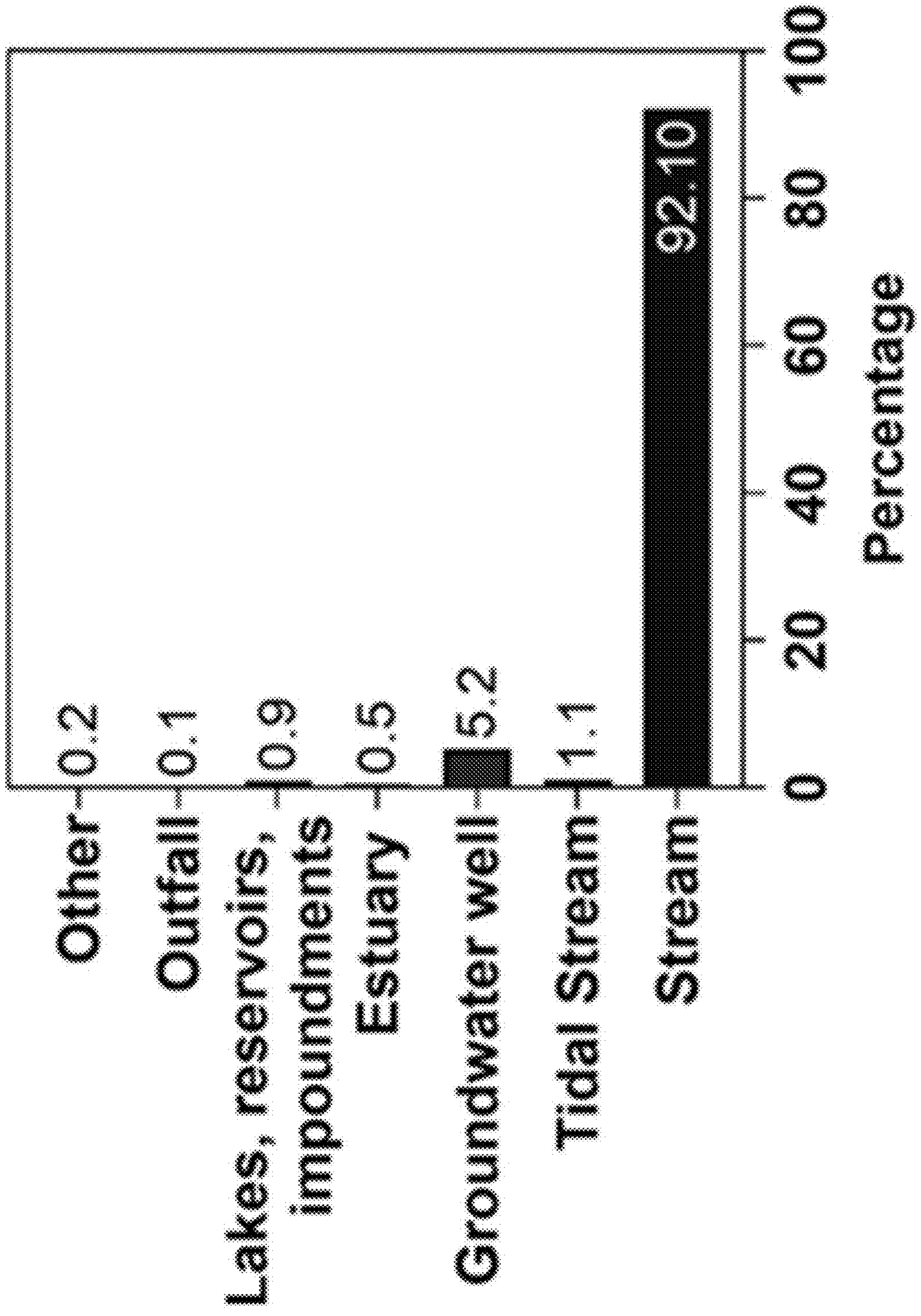
FIG. 19 shows water body types from which samples with Nd detects were obtained.

From the 6,626 filtered water samples (herein referred to as samples) with locations, 1,215 samples were identified as having Nd detections above the 1,200 CPS threshold (18%) and 69 QA/QC samples as analytical duplicates (MDUP), analytical spikes (MSK) and duplicate analytical spikes (MSPK) also demonstrated the presence of Nd (Table in FIG. 3). The majority of samples came from stream sites (92%) followed by groundwater wells (5.2%) and the rest were from various sources such as estuaries, lakes, reservoirs, tidal streams, and outfalls (2.8%). FIG. 19 shows water body types from which samples with Nd detects were obtained. Of the 1,215 filtered samples, 980 had available pH data, with a mean value of 8.15, minimum of 3.1 and maximum of 9.38. The 15 samples with highest estimated Nd concentrations (5-269 μg/L) that had available pH data demonstrated a spread of pH values ranging from 3.63-8.42.

While it is expected that high concentrations (>100 μg/L) of REEs would be found in low pH environments such as those impacted by acid mine drainages, results from the screening dataset demonstrate that some surface water sites, such as a site identified in the northern shortgrass prairie region (a temperate grassland, savanna and shrubland) can be present with both a higher pH (8) and high REE concentrations, an estimated 81 μg/L compared to a reported mean value of 0.152 μg/L. Typically, dissolved REEs in river waters are inversely correlated with pH, with more acidic waters having higher REE concentrations. However, elevated carbonate concentrations have been linked to increases in dissolved REE concentrations due to complexation and it follows that in circumneutral pH or more alkaline waters this phenomenon could be occurring. Similarly, the lower concentration range of Nd estimated via the screening measurement also demonstrated a wide breadth of pH values, ranging from 3.1-9.38. This wide range of behavior between pH and REE concentration highlights the usefulness of Q-STAR™ in that detections can lead to deeper investigations of potential REEs resources or contaminated sites that could be overlooked if more simple geochemical measurements such as pH were solely used.

It was noted that in the complete dataset (n=6,626), a similar respective percentage of samples came from Colorado (17% total vs. 20.5% detects) and Connecticut (4.2% total vs. 6.4% detects). However, interestingly, in the complete dataset 10.3% of samples came from California but only 1.15% of samples with Nd detects came from the same state. Nd detects along the border between southern California and Nevada could be due to the presence of the Mountain Pass Deposit. However, none were found in this dataset, illustrating that potential hotspots were only identified in locations that had been sampled. The application of the methods of the invention over an extended time frame could increase geographical representation and thereby improve its utility and REE resource identification.

The maximum estimated Nd concentration observed was 269.3 μg/L, with an average estimated concentration of 1.1 μg/L and a median value of 0.2 μg/L. A previous study in which ~500 stream water samples from across a ~400 $km^2$ area were analyzed for REEs demonstrated an average concentration of 0.3 μg/L, similar to the median value reported here. However, using Q-STAR™, the average concentration measured across 1,215 samples was an order of magnitude higher due to the increased screening area (the US is ~9.68 million $km^2$, Puerto Rico is ~9,104 $km^2$), and increased sample diversity, which stemmed from a variety of water bodies (FIG. 19) with different underlying geochemistry, geology, and ecoregions (FIGS. 10 to 16).

The use of the methods of the invention allows for more varied detection of REEs in water samples compared to a focused analysis. These concentrations are representative of dissolved water concentrations and could therefore lead to investigations of potential surrounding REE sources or deposits. The highest estimated Nd concentration sample identified was from a ditch site near the Avalanche Mine in San Juan County, Utah (see FIGS. 10 and 11). Other high level (5-239 μg/L) estimated Nd concentrations were identified in streams and outfalls in Colorado (31.2%), groundwater wells in New Jersey (43.8%), and streams in North Dakota (25%). The sample with lowest estimated Nd concentration of 0.0813 μg/L came from a stream in Granby, CO. While this concentration is outside of the 0.1 μg/L range used in calibration, the measured CPS value does fall within the 1,200 threshold and some instrument variability is expected.

In the subset of archived samples selected for quantitative analysis, all 85 archived samples had measurable REE concentrations, not only of Nd but also of La, Ce, Pr, Sm, Gd, and Y. Environmental samples (n=76) also had measurable concentrations of Eu, Ho, Tb, Dy, Lu, Er, and Tm. The lowest concentration of Nd measured was 0.06 μg/L and, overall, a total of 7% of samples fell below the 0.1 μg/L estimated threshold; however, Nd was still quantified in the 0.06 to 0.1 μg/L range. Broadly, measured concentrations of REEs generally followed the Oddo-Harkins rule which states that elements with an even atomic number (Ce, Nd, Sm, Gd, Dy, and Eu) are more abundant than elements with an odd atomic number (La, Pr, Eu, Tb, Ho, Tm, and Lu). Of the 76 environmental samples, only 4 varied slightly from the Oddo-Harkins rule with Ce being less abundant compared to La but still more abundant than subsequent odd-numbered elements.

Figure 20:
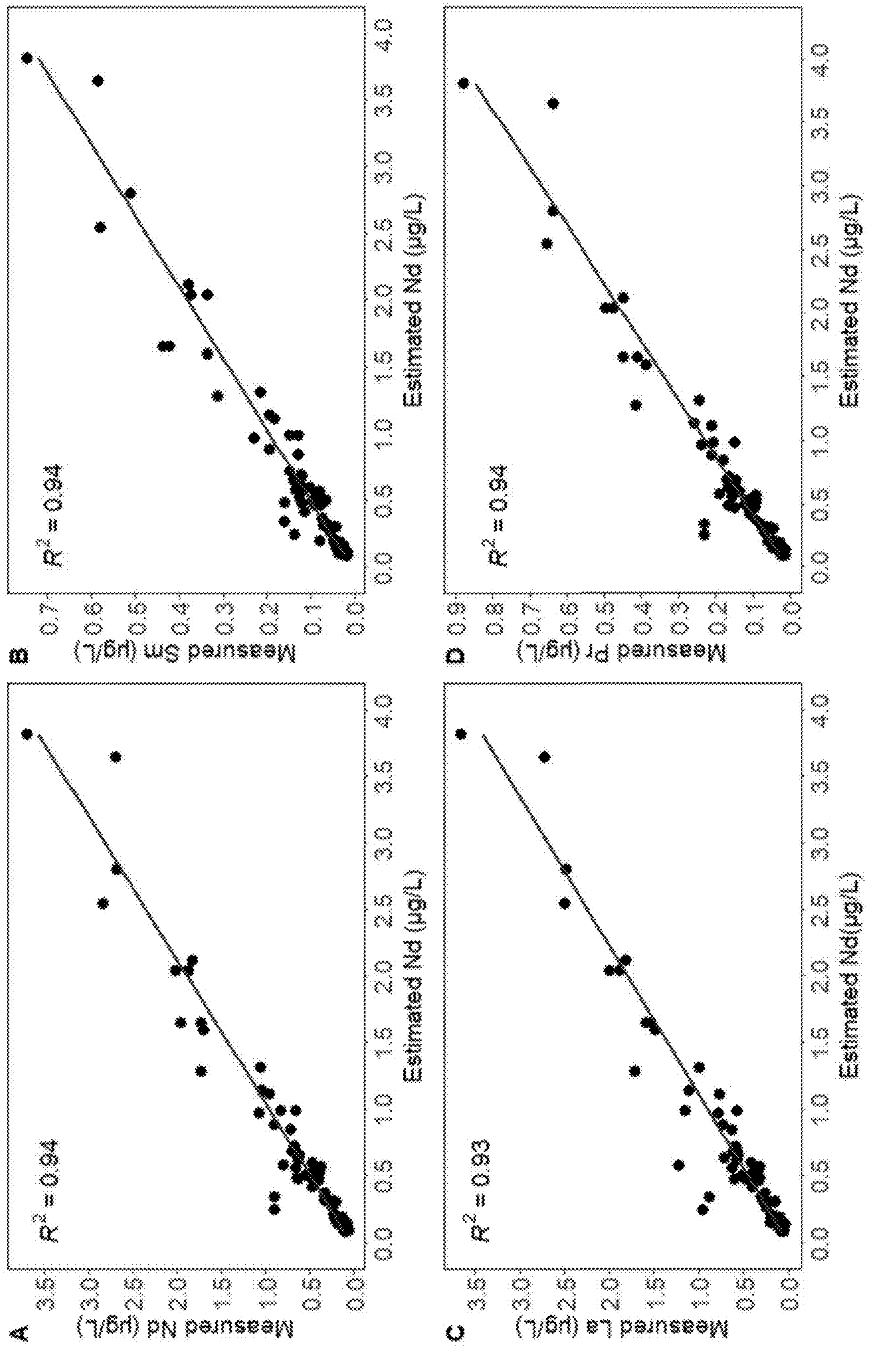
FIG. 20 shows graphical plots of (A) measured Nd, (B) measured Sm, (C) measured La, and (D) measured Pr versus predicted/estimated Nd from a subset of archived samples (n=83 as shown).

FIG. 20 shows graphical plots of (A) measured Nd, (B) measured Sm, (C) measured La, and (D) measured Pr versus predicted/estimated Nd from a subset of archived samples (n=83 as shown). Linear regression was performed in R and the correlation coefficients ($R^2$) values are shown. A linear relationship exists between estimated dissolved Nd and measured dissolved Nd from 0 to 4 μg/L, with an of $R^2$=0.94 (n=85). Here, $R^2$ represents correlation coefficient values and n represents the number of samples. This value increases slightly to $R^2$=0.98 (n=88) when the maximum concentration is extended to 130 μg/L, adding the two dissolved measured samples with the highest concentrations. At the lower concentration range, 0 to 0.7 μg/L, the relationship is not as strong with an $R^2$=0.76 (n=69), with overestimation being more common at lower concentrations. It is hypothesized that, at lower concentrations, not only is there more variability but also the screening method inherently overestimates Nd concentrations compared to quantitation due to the Sm interference.

Figure 21:
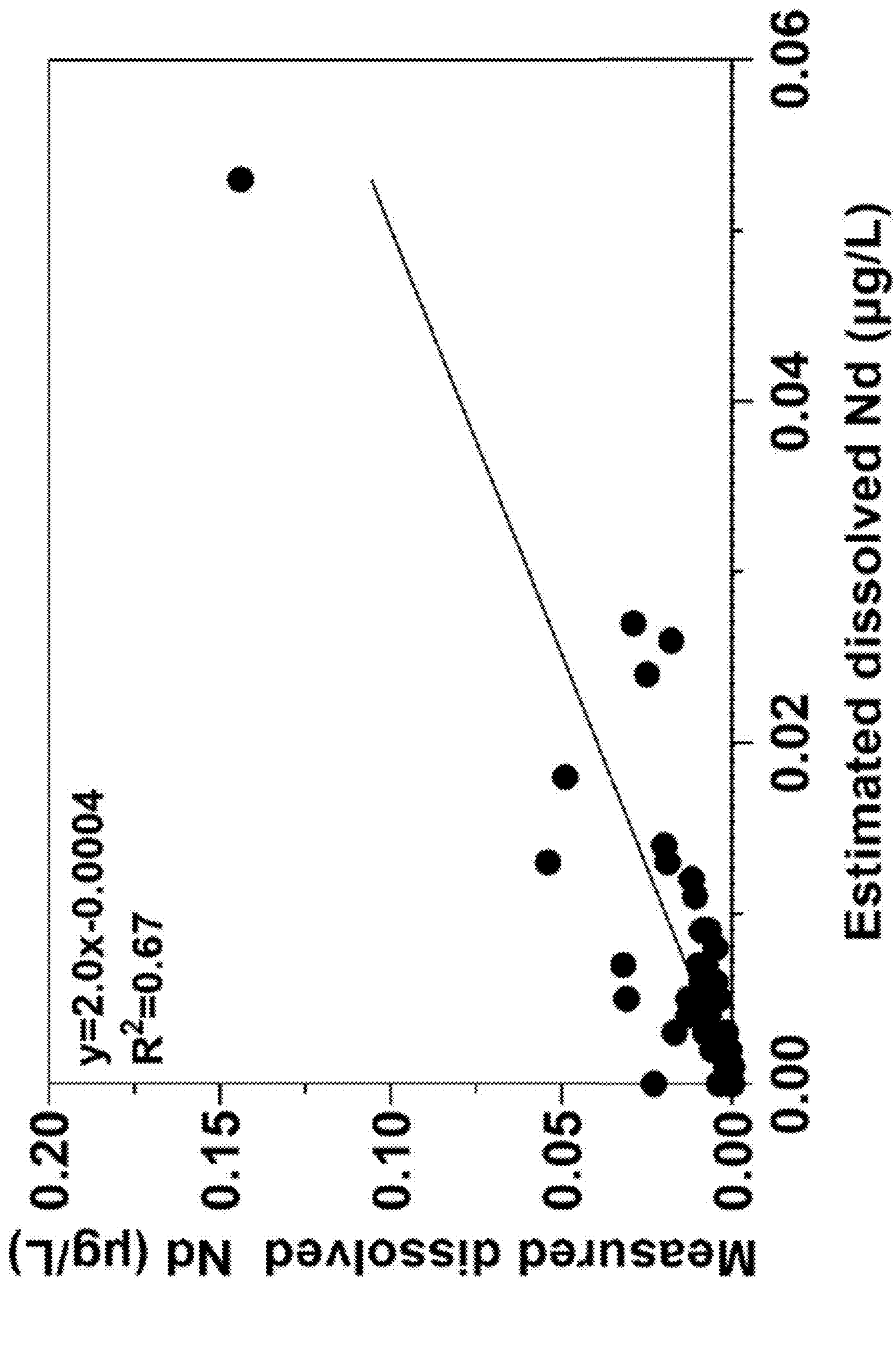
FIG. 21 shows a graphical plot of measured versus estimated concentrations of Nd in samples with CPS less than 1,200 CPS in archived samples used as negative controls.

FIG. 21 shows a graphical plot of measured versus estimated concentrations of Nd in samples with CPS less than 1,200 CPS in archived samples used as negative controls. In the samples measured with m/z=144 values less than 1,200 CPS, the average absolute difference between the predicted and measured Nd values was 0.009 μg/L, with an average measured Nd value of 0.016 μg/L. The linear relationship between measured and estimated Nd was weaker than samples with estimated 0 to 4 μg/L of Nd ($R^2$=0.67), which would be expected for very low concentrations and non-detects (see table in FIG. 6).

Linear relationships between estimated Nd and other measured dissolved REEs also exist. From 0 to 4 μg/L, a distinct linear relationship exists between estimated dissolved Nd and dissolved LREEs: Nd ($R^2$=0.94), Sm ($R^2$=0.94), La ($R^2$=0.93), and Pr ($R^2$=0.94) (FIG. 20).

Figure 22:
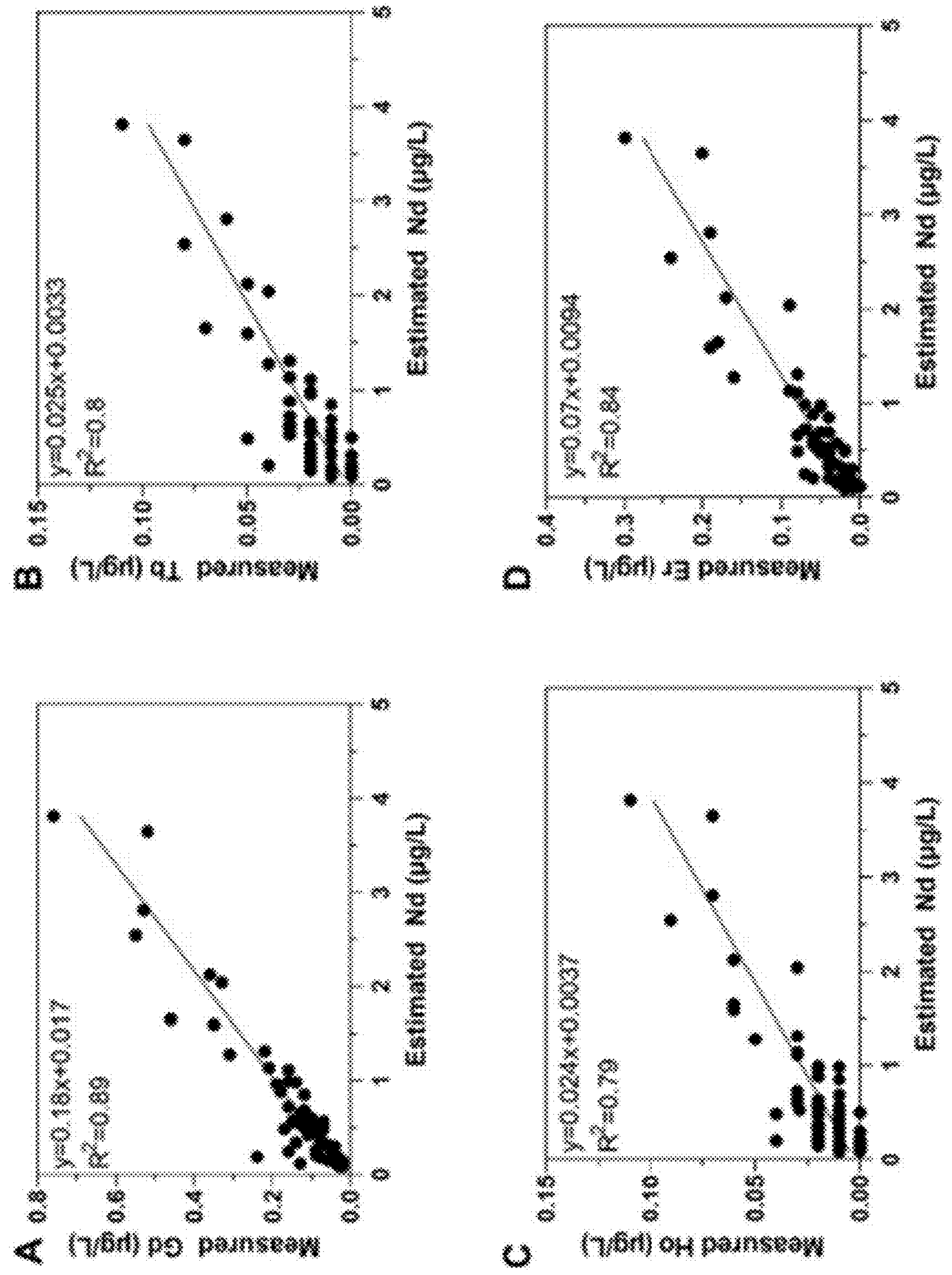
FIG. 22 shows graphical plots of (A) measured Gd, (B) measured Tb, (C) measured Ho, and (D) measured Er versus predicted Nd from a subset of measured samples used in digital panning.

FIG. 22 shows graphical plots of (A) measured Gd, (B) measured Tb, (C) measured Ho, and (D) measured Er versus predicted Nd from a subset of measured samples used in digital panning. Linear regression was performed in R and the determination coefficients ($R^2$) values are shown. Some HREE relationships are also linear, with $R^2$ values of Gd ($R^2$=0.92), Tb ($R^2$=0.93), Ho ($R^2$=0.88), and Er ($R^2$=0.88). These heavier elements were generally measured in much lower concentrations, on the order of 0.01 μg/L or 10 ng/L. Lower concentrations of HREEs were expected based on typical REE abundances, with LREEs being more common in the earth's crust and HREEs being relatively less abundant.

Figure 23:
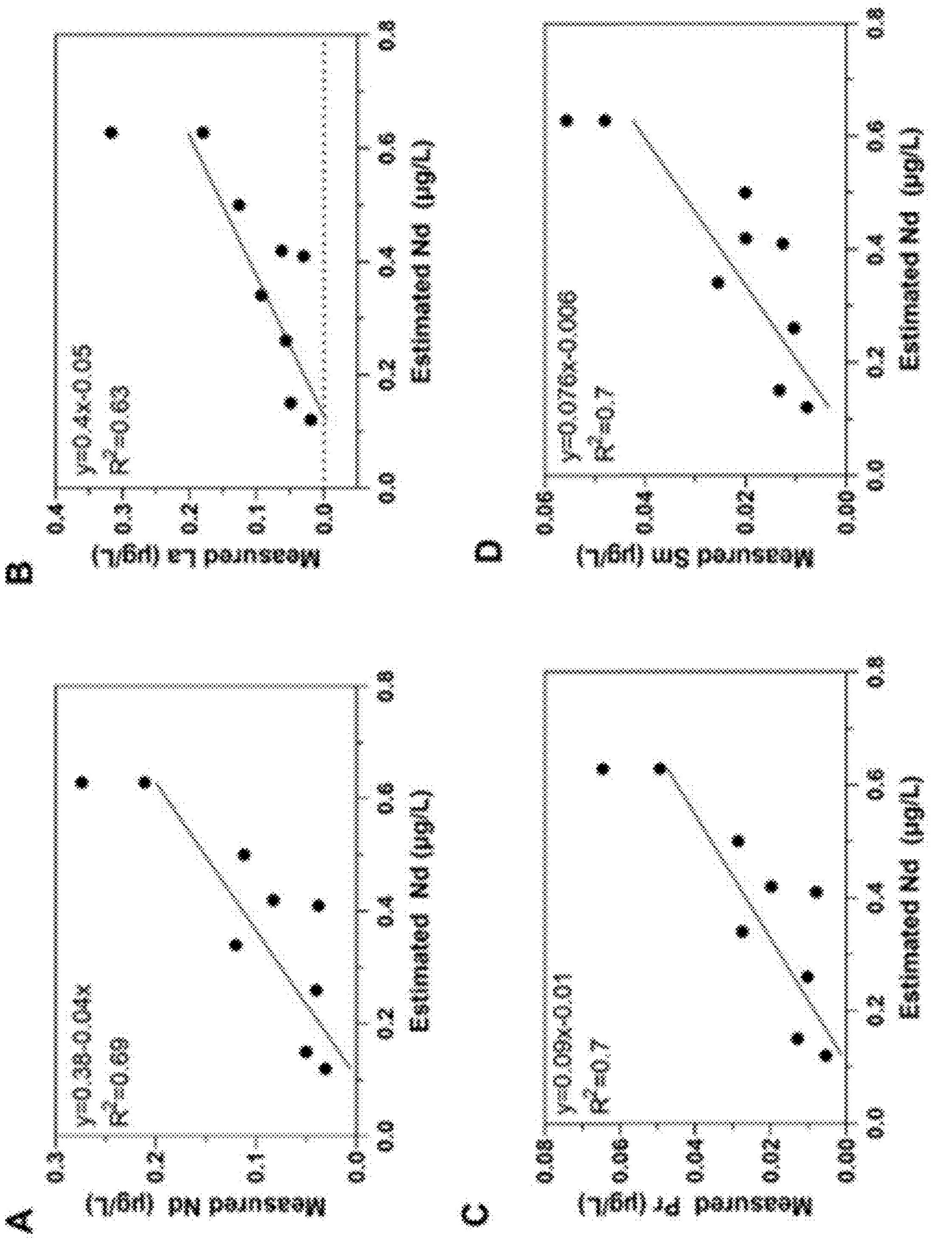
FIG. 23 shows graphical plots of (A) measured dissolved Nd, (B) measured Sm, (C) measured La, and (D) Pr from nine field sites versus the estimated dissolved concentrations from samples taken on dates closest to 2022 field resampling campaigns.

FIG. 23 shows graphical plots of (A) measured dissolved Nd, (B) measured Sm, (C) measured La, and (D) Pr from nine field sites versus the estimated dissolved concentrations from samples taken on dates closest to 2022 field resampling campaigns. Estimated values were calculated using the REE proxy for samples in the digitally panned/screened dataset. From the field sites sampled, REEs were identified at each site in varying concentrations. A linear relationship between estimated Nd and measured Nd ($R^2$=0.69) exists if seasonality is considered. Each of the nine field sites were sampled in May and June and, when measured values are compared to average values throughout the year at each site, no relationship exists between predicted and measured values. Measured Nd values ranged from 0.031 to 0.274 μg/L with five of the nine sites falling below the predicted 0.1 μg/L threshold value. These lower values could be attributed to differences in environmental conditions and precipitation events that may have occurred in 2021 vs. 2022. The relationships between predicted Nd and LREEs were also dependent upon seasonality and somewhat linear trends emerged between predicted values for Nd and Sm ($R^2$=0.59), La ($R^2$=0.68), and Pr ($R^2$=0.66). However, the fact that screening detections occurred in one year, and quantitative validation occurred in a subsequent year, suggests the likelihood and value of long-term detection of REEs utilizing the methods of the invention, rather than based on an ephemeral event.

This work is an example of how Q-STAR™ can be leveraged with sample collection servicing other studies to effectively identify REEs. It is worth noting while the concentrations observed in the current study are not economically viable for extraction, these data are representative of dissolved water and could therefore lead to investigations of potential surrounding sources and/or environmental impact studies. The present method uses ICP-MS to target REE exploration in a passive and cost-effective way to facilitate detection of potential REE resources.

The use of this screening method allows for the examination of REEs in ecoregions and biomes (FIGS. 10 and 11) and underlying geology (FIG. 16). Detections of REEs were identified in 42 out of the 92 ecoregions that had samples screened for REEs in the current study. Ecoregions were determined in ArcGIS Pro using the RESOLVE Ecoregions and Biomes dataset, available on ArcGIS hub. Ecoregions in this dataset are defined as distinct assemblages of biodiversity-all taxa whose boundaries include the space required to sustain ecological processes. The maximum values in the 42 ecoregion were averaged in each of the 7 biomes where detections occurred to describe where REEs were most concentrated: (i) deserts and xeric shrublands (54.78 μg/L), (ii) temperate conifer forests and grasslands (38.30 μg/L), (iii) savannas and shrublands (8.04 μg/L), (iv) tropical & subtropical grasslands, savannas & shrublands (1.53 μg/L), (v) temperate broadleaf and mixed forests (0.92 μg/L), (vi) tundra (0.18 μg/L), and (vii) Mediterranean forests, woodlands and scrub (0.15 μg/L).

3.3 Elemental Correlation Analysis

Relationships between Nd and other elements were also explored in both the digitally panned dataset and quantitatively measured archived samples. A correlation matrix was made using a Spearman rank correlation. In the digitally panned dataset, internal standards were not included in the analysis nor were elements with substantial missing values, copper, and bismuth.

FIG. 24 shows a table of Spearman rank correlation matrix results from archived subset of samples quantitatively analyzed for REEs and other elements at BCSL via both ICP-MS and ICP-OES. A select few REEs are shown due to a higher rate of detection of these elements in the majority of samples. From the correlation matrix with 37 elements using 76 achieved samples, relationships between Nd and Be (ρ=0.65), Cr (ρ=0.58), Ti (ρ=0.65), and Al (ρ=0.71) were confirmed and a relationship between Nd and Fe (ρ=0.44) was observed. REEs including Ce, Y, Sm, Gd, and La generally had higher concentrations and were therefore used in the correlation matrix analysis. These elements had similar correlation values as Nd with the elements listed above and additionally, the correlation among the REEs themselves was quite strong, with an average ρ value of 0.97. These results further demonstrate the powerful capabilities of the m/z=144 monitoring as an REE proxy by the methods of the invention.

Some of these elemental relationships have been observed previously, such as that between Al, Zn, and Co in coal mine drainage. Acid mine drainage environments are settings where relationships between REEs, specifically Nd and Zn, have been noted. While REEs may be expected in mining environments, it is not surprising that elemental relationships also exist at circumneutral pH levels, characteristic of most samples analyzed here. When primary carbonates and phosphates release REEs into soil solutions, these elements may incorporate into secondary phases such as clay minerals, carbonates, and Fe and manganese (Mn)-oxides. Further dissolution of these sometimes-labile phases could occur if chemical or biological reductants were present or if there were ephemeral geochemical shifts such as pH or ionic strength. Here, the relationship between Nd and Al in the digitally panned data and archived subset (n=76), as well as with Ti and Fe in the measured archived subsets, suggests that a relationship exists between REEs and clay minerals more strongly than with Mn oxides. Al-rich clay minerals such as kaolinite and illite have been cited as potentially important sources of REEs and ion-adsorption clay deposits in Southern China are the world's primary source of HREEs. REEs have also demonstrated strong relationships with Fe minerals previously; however, the relationship here is not particularly strong (ρ=0.44). Therefore, it is hypothesized that these results could be more indicative of a relationship with clay minerals (i.e., biotite, illite, etc.) as opposed to Fe (oxyhydr)oxides or oxides.

In addition to relationships with inorganic species, REEs and dissolved organic carbon (DOC) have also been previously linked. DOC has been hypothesized to be a driver of REE sediment release into aquatic systems and geochemical modeling has suggested that aqueous REE species can occur primarily as bi-dentate organic complexes in DOC rich soil waters. Specifically, increasing concentrations of Gd have been linked to high DOC concentrations.

3.4 Utility of $^{144}$Nd as a Q-STAR™ for Site Identification in Screened Datasets The highest estimated Nd concentration sample in the screened dataset (269.3 μg/L) identified was in the Colorado Plateau shrublands ecoregion, a desert and xeric shrublands biome two miles from the Avalanche Mine (located at 37.77528, −109.703, USGS site number 374631109420901). The Avalanche Mine is an underground mine part of the Elk Ridge District, which produces significant uranium (U), an element often associated with REEs in mineral assemblages and source rocks. Uranium production occurred from 1951-1970, with significant production of U and copper (Cu), with total district metal production estimated to be $68 million at modern prices as of 2018. The main host stratum in the Elk Ridge district is the Upper Triassic Shinarump Conglomerate Member of the Chinle Formation, with underlying formations such as the Moenkopi Formation and the Hermosa Group and Molas Formation, both of which are sedimentary (FIG. 16).

Phosphate phases enriched in REEs such as monazite ($(Ce,La,Nd)PO_4$) and xenotime ($YPO_4$) occur in sedimentary rocks and authigenic phases often contain high U concentrations. Correspondingly, the highest estimated Nd concentration sample contained elevated concentrations of U (13,655 μg/L) as well as Mn (1,332 μg/L), cobalt (Co) (8,655 μg/L), nickel (Ni) (6,109 μg/L), Cu (5,590 μg/L), zinc (Zn) (9,036 μg/L), and Al (9,206 μg/L). Uranium mine tailings have been considered as a potential source of REEs and can include other critical minerals such as Mn and Ni. Bioleaching is one of the proposed mechanisms for liberation of REEs from solid waste productions, in which microbial species either use an external carbon source and generate complexing ligands that bind the metal of interest or oxidize reduced solid phases (such as pyrite ($FeS_2$) to liberate metals. It is possible that this process could be occurring naturally and that microbial communities surrounding the mine could have liberated solid phase REEs indirectly via metabolic processes linked to pyrite oxidation. Further examination of geochemical conditions at the site (i.e., pH, Fe and S content), as well as characterization of the microbial community could help to confirm this hypothesis. The identification of this site and subsequent investigation into ecoregion, geology and geochemistry is an example of what could not only be done with the current dataset (n=1,215), which has been made publicly available in a USGS data release, but what could be done with much larger datasets where the screening tool was employed.

3.5 REE Digital Panning or Screening Method

Figure 25:
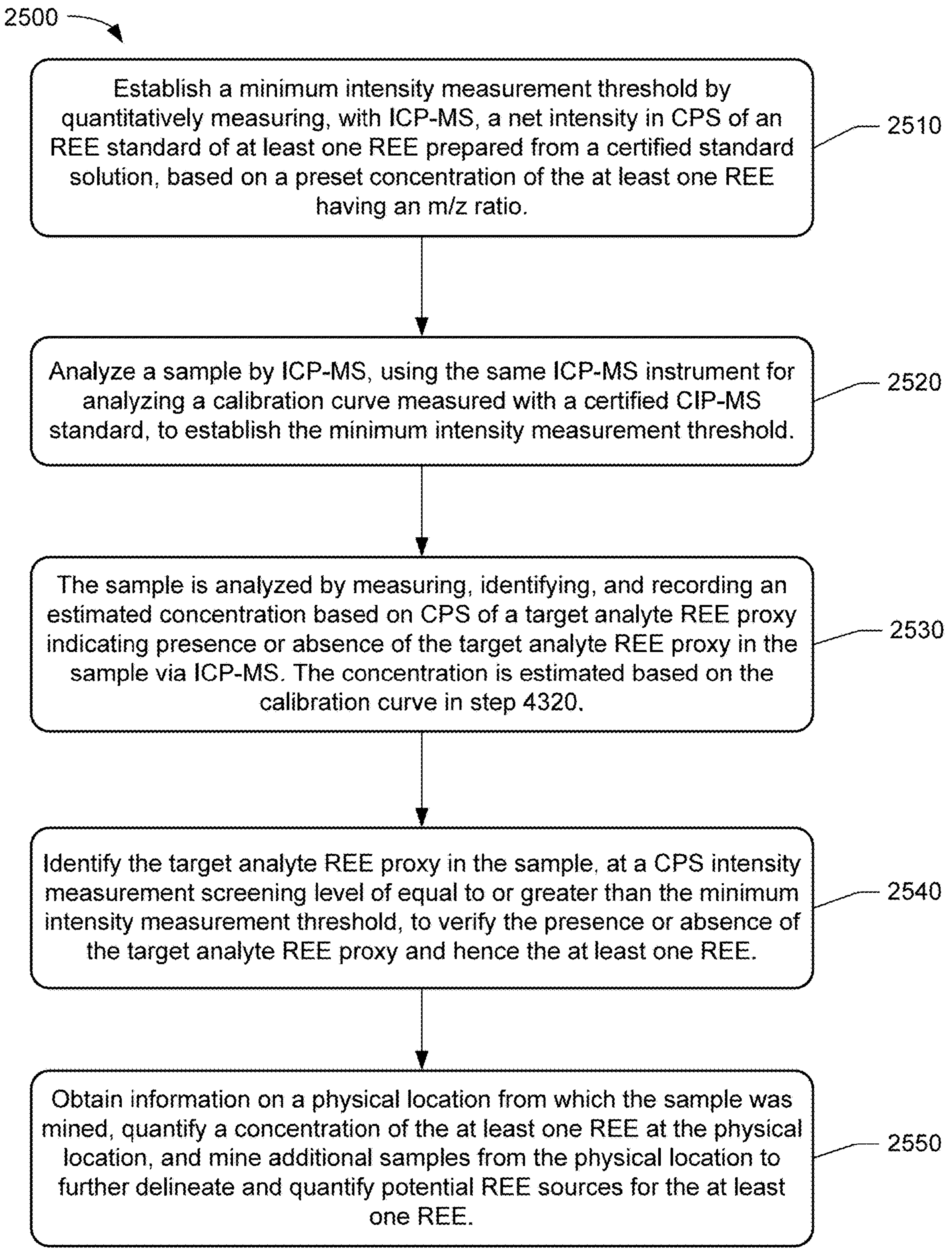
FIG. 25 is a flow diagram illustrating an example of an REE digital panning or screening method.

FIG. 25 is a flow diagram illustrating an example of an REE digital panning or screening method 2500. In step 2510, the method stablishes a minimum intensity measurement threshold. This may be done by quantitatively measuring, using ICP-MS, a net intensity in CPS of an REE standard of at least one REE prepared from a certified standard solution, based on a preset concentration of the at least one REE having an isotope mass to charge ratio (m/z). In step 2520, the method analyzes a sample by ICP-MS, using the same ICP-MS instrument for analyzing a calibration curve measured with a certified CIP-MS standard, to establish the minimum intensity measurement threshold. In step 2530, the sample may be analyzed by measuring, identifying, and recording an estimated concentration based on CPS of a target analyte REE proxy indicating presence or absence of the target analyte REE proxy in the sample via ICP-MS. The concentration is estimated based on the calibration curve in step 2520. In step 2540, the method identifies the target analyte REE proxy in the sample, at a CPS intensity measurement screening level of equal to or greater than the minimum intensity measurement threshold, to verify the presence or absence of the target analyte REE proxy and hence the at least one REE. In step 2550, the method obtains information on a physical location from which the sample was mined and quantifies a concentration of the at least one REE at the physical location. It may further mine additional samples from the physical location to further delineate and quantify potential REE sources for the at least one REE.

Figure 26:
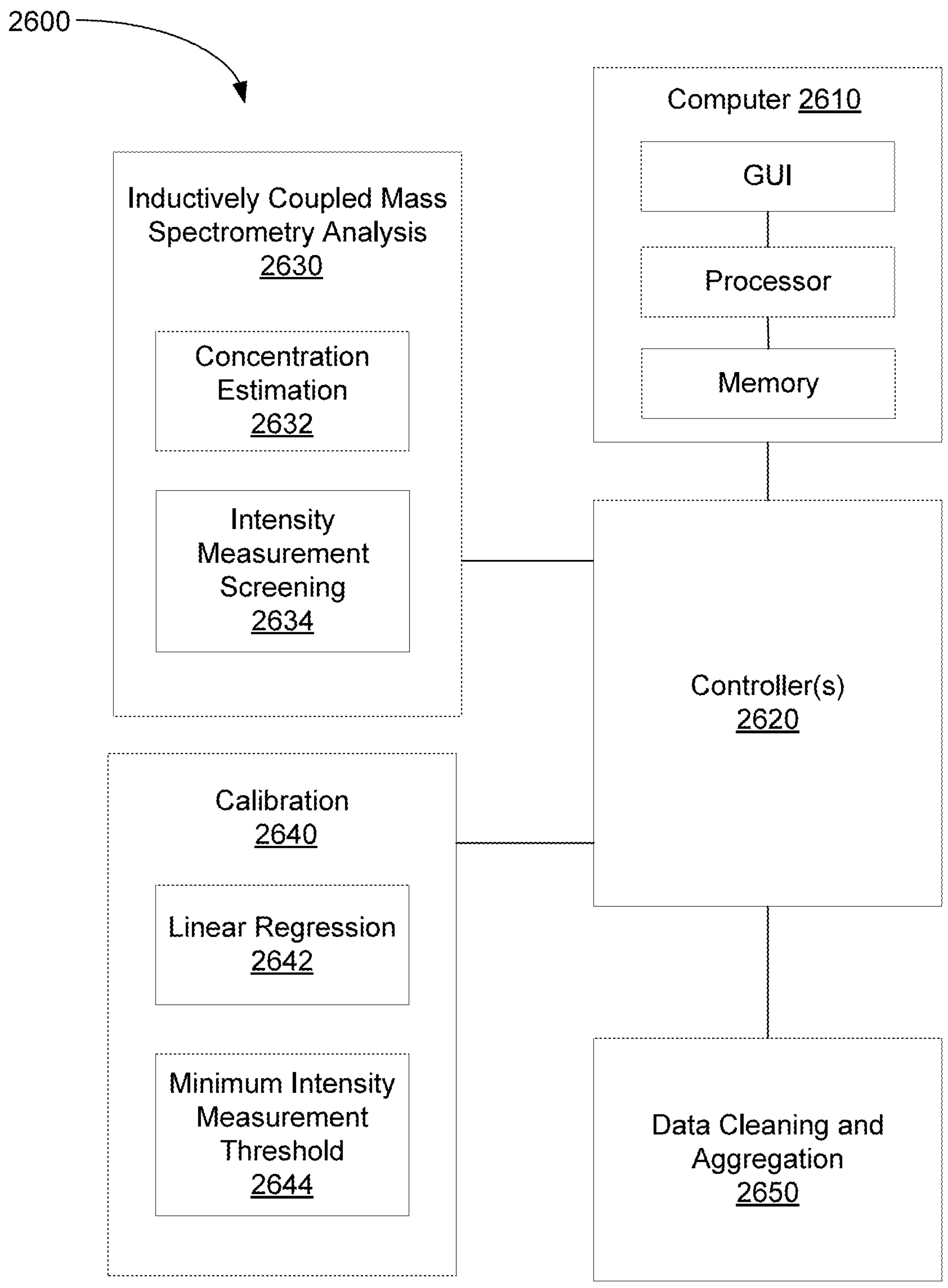
FIG. 26 is a block diagram schematically illustrating a REE digital panning or screening system.

FIG. 26 is a block diagram schematically illustrating a REE digital panning or screening system 2600. A computer 2610 includes a graphical user interface (GUI), a processor, and a memory. One or more controllers 2620 may be used to provide computer-implemented control of the REE digital panning process.

An inductively coupled mass spectrometry (ICP-MS) analysis module 2630 includes a concentration estimation submodule 2632 for estimating REE concentration. A calibration curve may be used to estimate REE (e.g., Nd) concentrations in one or more samples from an REE sample dataset. From this initial calibration curve, the relationship between concentration and CPS may be used to calculate an estimated REE concentration for the samples analyzed. The ICP-MS sample analysis module 2630 further includes an intensity measurement screening submodule 2634 for identifying a target analyte REE proxy in the sample(s) at a CPS intensity measurement screening level of equal to or greater than a minimum intensity measurement threshold to verify the presence or absence of the target analyte REE proxy and at least one REE. The ICP-MS analysis module 2630 analyzes the sample(s) by ICP-MS, which may include measuring, identifying, and recording the estimated concentration based on counts per second of the target analyte REE proxy indicating presence or absence of the target analyte REE proxy in the sample via ICP-MS.

A calibration module 2640 generates and processes a calibration curve measured with a certified ICP-MS standard on an ICP-MS instrument. The calibration module 2640 includes a linear regression submodule 2642 for performing linear regression on an REE sample dataset. From this calibration, the slope of the linear regression is used to estimate REE concentration. A minimum intensity measurement threshold submodule 2644 is configured to establish the minimum intensity measurement threshold by quantitatively measuring a net intensity in CPS of an REE standard of the at least one REE prepared from a certified standard solution, using ICP-MS, based on a preset concentration of the at least one REE having an isotope mass to charge ratio (m/z). The minimum intensity measurement threshold is established by analyzing the calibration curve.

A data cleaning and aggregation module 2650 is configured to clean and aggregate ICP-MS data to be processed by the calibration module 2640 and/or the ICP-MS analysis module 2630.

4. Computer System

Figure 27:
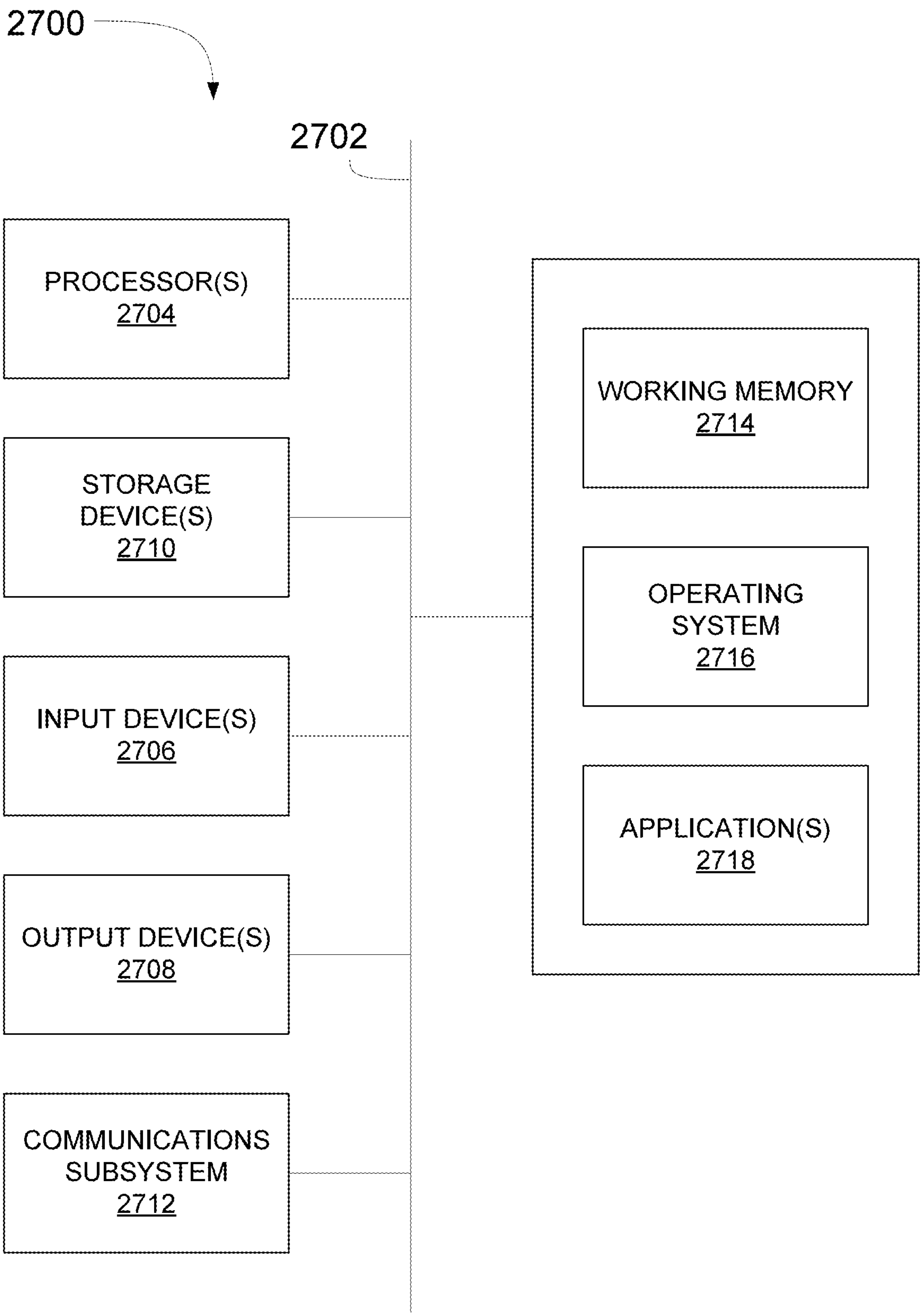
FIG. 27 depicts an exemplary computer system or device according to an embodiment of the present invention.

FIG. 27 depicts an exemplary computer system or device configured for use with the REE digital panning or screening system 2600 of FIG. 26, the screening process 2500 of FIG. 25, and the ICP-MS data cleaning and aggregating process 200 of FIG. 2 according to an embodiment of the present invention. The computer device 2700 of FIG. 27 is shown comprising hardware elements that may be electrically coupled via a bus 2702 (or may otherwise be in communication, as appropriate). The hardware elements may include a processing unit with one or more processors 2704, including without limitation one or more general-purpose processors and/or one or more special-purpose processors (such as digital signal processing chips, graphics acceleration processors, and/or the like); one or more input devices 2706, which may include without limitation a remote control, a mouse, a keyboard, and/or the like; and one or more output devices 2708, which may include without limitation a presentation device (e.g., controller screen), a printer, and/or the like. Input to the computer system 2700, such as desired printing parameters input into the machine G-code, may be provided by analog-to-digital converters and any other measurement devices into digital form for storage and/or processing. Separate external analog-to-digital devices can be attached to the bus 2702 or communication subsystem 2712 to provide measurements in digital form to the computer system 2700. In some cases, an output device 2708 may include, for example, a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide a non-visual display such as via audio output devices. In general, use of the term "output device" is intended to include a variety of conventional and proprietary devices and ways to output information from computer system 2700 to a user. Output from the computer system 2700 may be provided to digital-to-analog converters to send control signals from the computer to the delivery valves 240 (and optionally the temperature control unit 290 and/or the gate valve 218) and any other mechanisms used in other embodiments. Digitally controlled motors or actuators may be attached to the bus 2702 or communication subsystem 2712 for digital control by the computer.

The computer system 2700 may further include (and/or be in communication with) one or more non-transitory storage devices 2710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 2700 can also include a communications subsystem 2712, which may include without limitation a modem, a network card (wireless and/or wired), an infrared communication device, a wireless communication device and/or a chipset such as a Bluetooth device, 802.11 device, Wi-Fi device, WiMAX device, cellular communication facilities such as GSM (Global System for Mobile Communications), W-CDMA (Wideband Code Division Multiple Access), LTE (Long Term Evolution), and the like. The communications subsystem 2712 may permit data to be exchanged with a network (such as the network described below, to name one example), other computer systems, controllers, and/or any other devices described herein. In many embodiments, the computer system 2700 can further comprise a working memory 2714, which may include a random access memory and/or a read-only memory device, as described above.

The computer device 2700 also can comprise software elements, shown as being currently located within the working memory 2714, including an operating system 2716, device drivers, executable libraries, and/or other code, such as one or more application programs 2718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code can be stored on a non-transitory computer-readable storage medium, such as the storage device(s) 2710 described above. In some cases, the storage medium might be incorporated within a computer system, such as computer system 2700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 2700 and/or might take the form of source and/or installable code, which, upon compilation and/or installation on the computer system 2700 (e.g., using any of a variety of generally available compilers, installation programs, compression/decompression utilities, and the like), then takes the form of executable code.

It is apparent that substantial variations may be made in accordance with specific requirements. For example, customized hardware might also be used, and/or particular elements might be implemented in hardware, software (including portable software, such as applets, and the like), or both. Further, connection to other computing devices such as network input/output devices may be employed.

As mentioned above, in one aspect, some embodiments may employ a computer system (such as the computer device 2700) to perform methods in accordance with various embodiments of the disclosure. According to a set of embodiments, some or all of the procedures of such methods are performed by the computer system 2700 in response to processor(s) 2704 executing one or more sequences of one or more instructions (which might be incorporated into the operating system 2716 and/or other code, such as an application program 2718) contained in the working memory 2714. Such instructions may be read into the working memory 2714 from another computer-readable medium, such as one or more of the storage device(s) 2710. Merely by way of example, execution of the sequences of instructions contained in the working memory 2714 may cause the processor(s) 2704 to perform one or more procedures of the methods described herein.

The terms "machine-readable medium" and "computer-readable medium," as used herein, can refer to any non-transitory medium that participates in providing data that causes a machine to operate in a specific fashion. In an embodiment implemented using the computer device 2700, various computer-readable media might be involved in providing instructions/code to processor(s) 2704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 2710. Volatile media may include, without limitation, dynamic memory, such as the working memory 2714.

Exemplary forms of physical and/or tangible computer-readable media may include a floppy disk, a flexible disk, hard disk, magnetic tape, or any other magnetic medium, a compact disc, any other optical medium, ROM, RAM, and the like, any other memory chip or cartridge, or any other medium from which a computer may read instructions and/or code. Various forms of computer-readable media may be involved in carrying one or more sequences of one or more instructions to the processor(s) 2704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 2700.

The communications subsystem 2712 (and/or components thereof) generally can receive signals, and the bus 2702 then can carry the signals (and/or the data, instructions, and the like, carried by the signals) to the working memory 2714, from which the processor(s) 2704 retrieves and executes the instructions. The instructions received by the working memory 2714 may optionally be stored on a non-transitory storage device 2710 either before or after execution by the processor(s) 2704.

It should further be understood that the components of computer device 2700 can be distributed across a network. For example, some processing may be performed in one location using a first processor while other processing may be performed by another processor remote from the first processor. Other components of computer system 2700 may be similarly distributed. As such, computer device 2700 may be interpreted as a distributed computing system that performs processing in multiple locations. In some instances, computer system 2700 may be interpreted as a single computing device, such as a distinct laptop, desktop computer, or the like, depending on the context.

A processor may be a hardware processor such as a central processing unit (CPU), a graphic processing unit (GPU), or a general-purpose processing unit. A processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 612-bit, 256-bit, 128-bit, 64-bit, 32-bit, or 16-bit data operations.

Each of the calculations or operations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. All features of the described systems are applicable to the described methods mutatis mutandis, and vice versa. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modification, adaptations, and changes may be employed.

As will be appreciated by one of ordinary skill in the art, the present invention may be embodied as an apparatus (including, for example, a system, a machine, a device, and/or the like), as a method (including, for example, a business process, and/or the like), as a computer-readable storage medium, or as any combination of the foregoing.

5. Conclusions

Embodiments of the invention illustrate the novel use of m/z=144 as a screening method in ICP-MS analyses to efficiently screen large number of samples for the presence or absence of REEs. Results demonstrate the method was successful, with a strong relationship between estimated Nd and Nd measured, as well as estimated Nd and other LREEs measured. Further method verification efforts were taken by collecting fresh field samples from nine sites where the Q-STAR™ method indicated REEs were present. The resultant positive detections highlighted the usefulness of the Q-STAR™ technique. This method is well suited to screen a large and diverse set of samples where time and labor-intensive quantitative analysis of REEs in unknown samples is simply not feasible. Studies aimed toward large scale characterization, on watershed and continental scales, would benefit from the use of Q-STAR™ to improve global understanding of aqueous REE concentrations, distribution, and geochemistry. Overall, the researchers demonstrate that this novel method is an adequate and robust way to semi-quantitatively examine large numbers of filtered water samples for REEs.

The invention involves highly efficient and accurate analyses of dissolved water samples, so that detection of REEs in these samples could lead to still further studies of surrounding REE sources. Further quantitative measurements are needed after initial screening because the analyte proxy functions as a qualitative measure. The concentration range with the proxy works best at higher concentrations and potential unknown matrix effects may exist. No samples were known to have come from a high salinity environment and additional testing could verify that the proxy methodologies of the invention would work under these conditions as well.

The methods described involve dissolved samples and could be optimized for unfiltered samples, depending on the complexity of the matrix (e.g., suspended solids) or for other types of samples such as digestates of soil, sediment, and biota samples, for example. Such conditions are not necessarily specific to the proxy technique using the methods of the invention but are globally related to ICP-MS analysis. The novel proxy methodology of the invention has been demonstrated to be a new and robust way to qualitatively examine a large number of dissolved water and other types of environmental samples to identify and locate REEs and potential REE resources.

All parameters presented herein including, but not limited to, sizes, dimensions, times, temperatures, pressures, amounts, quantities, ratios, weights, volumes, and/or percentages, and the like, for example, represent approximate values and can vary with the possible embodiments described and those not necessarily described but encompassed by the invention. For example, a concentration of 0.1 μg/L means about 0.1 μg/L. Unless otherwise defined, all technical and scientific terms used herein have the same meaning as commonly understood to one of ordinary skill in the art to which this invention belongs. Further, references to the singular forms "a", "an", and "the" concerning any particular item, component, material, or product include plural references and are defined as at least one and could be more than one, unless the context clearly dictates otherwise. The terminology employed is for the purpose of describing particular embodiments and is not intended to be limiting in any way.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

Embodiments of the invention can be manifest in the form of methods and apparatuses for practicing those methods. As compared to traditional manual process of rehabilitating a well affected by fouling, the benefits of implementing this technology include continuous and autonomous treatment and prevention, eliminating potential danger to personnel, preventing recolonization or regrowth, and significantly reducing the cost.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A method of identifying at least one rare earth element (REE) in at least one sample, the method comprising:

analyzing the at least one sample by inductively coupled plasma mass spectrometry (ICP-MS), which comprises measuring, identifying, and recording an estimated concentration based on counts per second of a target analyte REE proxy indicating a presence or absence of the target analyte REE proxy in the at least one sample via ICP-MS;

identifying the target analyte REE proxy in the at least one sample at counts per second (CPS) intensity measurement screening level of equal to or greater than a minimum intensity measurement threshold to verify the presence or absence of the target analyte REE proxy; and determining the minimum intensity measurement threshold based on a preset concentration of at least one REE having an isotope mass to charge ratio (m/z).

2. The method of claim 1, wherein the preset concentration is about 0.1 μg/L concentration.

3. The method of claim 1, further comprising:

establishing the minimum intensity measurement threshold by quantitatively measuring a net intensity in CPS of an REE standard of the at least one REE prepared from a certified standard solution, using ICP-MS, based on a preset concentration of the at least one REE having an isotope mass to charge ratio (m/z).

4. The method of claim 3, wherein the minimum intensity measurement threshold is established by analyzing a calibration curve measured with a certified ICP-MS standard on an ICP-MS instrument.

5. The method of claim 1, further comprising:

adjusting the minimum intensity measurement threshold, higher to narrow or lower to broaden a scope of identifying the target analyte REE.

6. The method of claim 1, further comprising:

obtaining information on a physical location from which the at least one sample was mined; and quantifying a concentration of at least one REE at the physical location.

7. The method of claim 6, further comprising, after identifying the target analyte REE proxy in the at least one sample:

collecting additional samples from the physical location to further delineate and quantify potential REE sources.

8. The method of claim 1, wherein the target analyte REE proxy is Neodymium (Nd) or Samarium (Sm), each having an isotope mass to charge ratio (m/z) of 144.

9. The method of claim 1, wherein the at least one REE is Scandium (Sc), or Yttrium (Y), or a lanthanide selected from the group consisting of Lanthanum (La), Cerium (Ce), Praseodymium (Pr), Neodymium (Nd), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), or any combination thereof.

10. The method of claim 1, further comprising:

obtaining the at least one sample which is a surface water, a groundwater, or a combination thereof.

11. The method of claim 1, further comprising:

obtaining the at least one sample which is an environmental solid, a soil, a sediment, a biota, or a combination thereof and performing a digestion thereof prior to use of the analyzing and the identifying.

12. The method of claim 1, further comprising:

analyzing at least one second sample from a different location than the at least one sample by inductively coupled plasma mass spectrometry (ICP-MS), which comprises measuring, identifying, and recording an estimated concentration based on counts per second of a target analyte REE proxy indicating presence or absence of the target analyte REE proxy in the at least one second sample via ICP-MS; and identifying the target analyte REE proxy in the at least one second sample at a counts per second (CPS) intensity measurement screening level of equal to or greater than a minimum intensity measurement threshold to verify the presence or absence of the target analyte REE proxy.

13. The method of claim 12, further comprising:

quantifying a concentration of at least one REE in a region between the location of the at least the one sample and the location of the at least one second sample that had a verified presence of the target analyte REE proxy.

14. The method of claim 1, further comprising:

cleaning and aggregating ICP-MS data obtained from performing ICP-MS on a plurality of samples;

analyzing the plurality of samples which comprises measuring, identifying, and recording an estimated concentration based on counts per second of the target analyte REE proxy indicating presence or absence of the target analyte REE proxy in the plurality of samples via ICP-MS; and identifying the target analyte REE proxy in the plurality of samples at a counts per second (CPS) intensity measurement screening level of equal to or greater than the minimum intensity measurement threshold to verify the presence or absence of the target analyte REE proxy.

15. A non-transitory computer-readable recording medium storing a program including instructions that cause a processor to execute an operation to identify at least one rare earth element (REE) in at least one sample, comprising:

analyzing the at least one sample by inductively coupled plasma mass spectrometry (ICP-MS), which comprises measuring, identifying, and recording an estimated concentration based on counts per second of a target analyte REE proxy indicating presence or absence of the target analyte REE proxy in the at least one sample via ICP-MS;

identifying the target analyte REE proxy in the at least one sample at a counts per second (CPS) intensity measurement screening level of equal to or greater than a minimum intensity measurement threshold to verify the presence or absence of the target analyte REE proxy; and establishing the minimum intensity measurement threshold by quantitatively measuring a net intensity in CPS of an REE standard of the at least one REE prepared from a certified standard solution, using ICP-MS, based on a preset concentration of the at least one REE having an isotope mass to charge ratio (m/z).

16. The non-transitory computer-readable recording medium of claim 15, wherein the program further includes instructions that cause the processor to execute an operation of:

analyzing a calibration curve measured with a certified ICP-MS standard on an ICP-MS instrument to establish the minimum intensity measurement threshold.

17. The non-transitory computer-readable recording medium of claim 15, wherein the program further includes instructions that cause the processor to execute an operation of:

obtaining information on a physical location from which the at least one sample was mined; and quantifying a concentration of the at least one REE at the physical location.

18. The non-transitory computer-readable recording medium of claim 15, wherein the program further includes instructions that cause the processor to execute an operation of:

cleaning and aggregating ICP-MS data obtained from performing ICP-MS on a plurality of samples;

analyzing the plurality of samples which comprises measuring, identifying, and recording an estimated concentration based on counts per second of the target analyte REE proxy indicating presence or absence of the target analyte REE proxy in the plurality of samples via ICP-MS; and identifying the target analyte REE proxy in the plurality of samples at a counts per second (CPS) intensity measurement screening level of equal to or greater than the minimum intensity measurement threshold to verify the presence or absence of the target analyte REE proxy.

* * * * *